(12) United States Patent
Ogura

(10) Patent No.: US 6,963,528 B2
(45) Date of Patent: Nov. 8, 2005

(54) DIGITAL DATA REPRODUCTION APPARATUS

(75) Inventor: Youichi Ogura, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 645 days.

(21) Appl. No.: 10/201,939

(22) Filed: Jul. 25, 2002

(65) Prior Publication Data
US 2003/0021208 A1    Jan. 30, 2003

(30) Foreign Application Priority Data
Jul. 26, 2001 (JP) .............................. 2001-225737

(51) Int. Cl.⁷ .............................................. G11B 5/09
(52) U.S. Cl. ................ 369/59.22; 369/59.1; 369/59.15
(58) Field of Search .......................... 369/47.1, 47.11, 369/47.15, 47.28, 53.1, 59.1, 59.15, 59.22, 369/59.21

(56) References Cited

U.S. PATENT DOCUMENTS 5,552,942 A * 9/1996 Ziperovich et al. ........... 360/51
6,834,035 B1 * 12/2004 Marukawa et al. ...... 369/59.22

FOREIGN PATENT DOCUMENTS

| JP | 4-245711 | 9/1992 |
| JP | 10-269648 | 10/1998 |
| JP | 2999759 | 11/1999 |
| JP | 2001-101799 | 4/2001 |
| WO | 01/26111 | 4/2001 |

* cited by examiner

Primary Examiner—Muhammad Edun
(74) Attorney, Agent, or Firm—Wenderoth, Lind & Ponack, L.L.P.

(57) ABSTRACT

In a digital data reproduction apparatus for demodulating digital data from an optical recording medium, PRML (Partial Response Maximum Likelihood) signal processing effective to high-density recording/reproduction is carried out by using a half rate processing offset control means which performs data demodulation using half of the channel bit frequency, a half rate processing phase sync control means, a half rate processing adaptive equalization means, and a half rate processing maximum likelihood decoder, and the digital data recorded on the optical recording medium are reproduced while restoring signal components which are missing in the time direction, by linear interpolation or Nyquist interpolation. Therefore, digital data reproduction performance is improved, and power consumption is reduced.

17 Claims, 13 Drawing Sheets

T: time corresponding to 1 channel bit

○ sampling signal
● interpolation signal phase error profile phase error profile

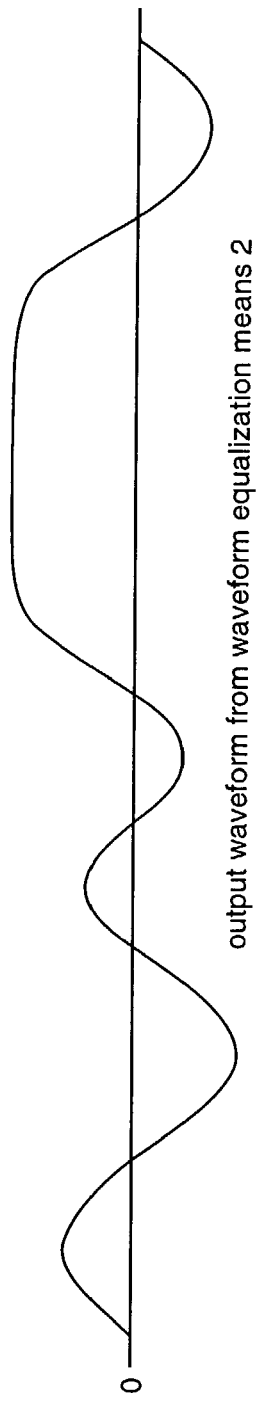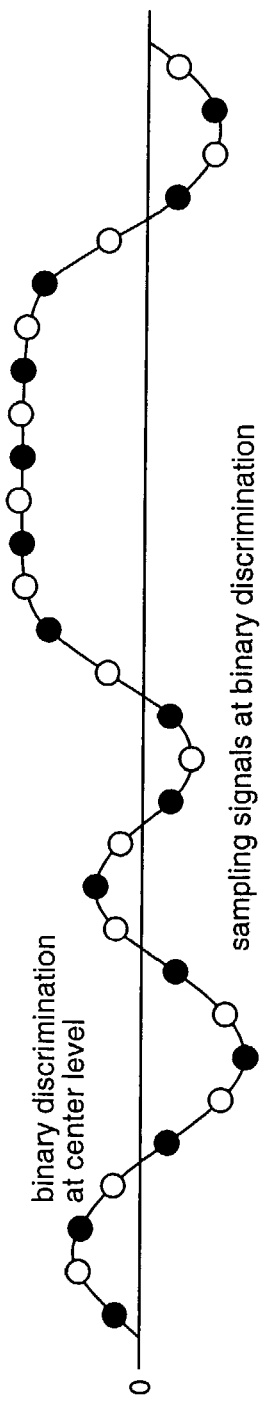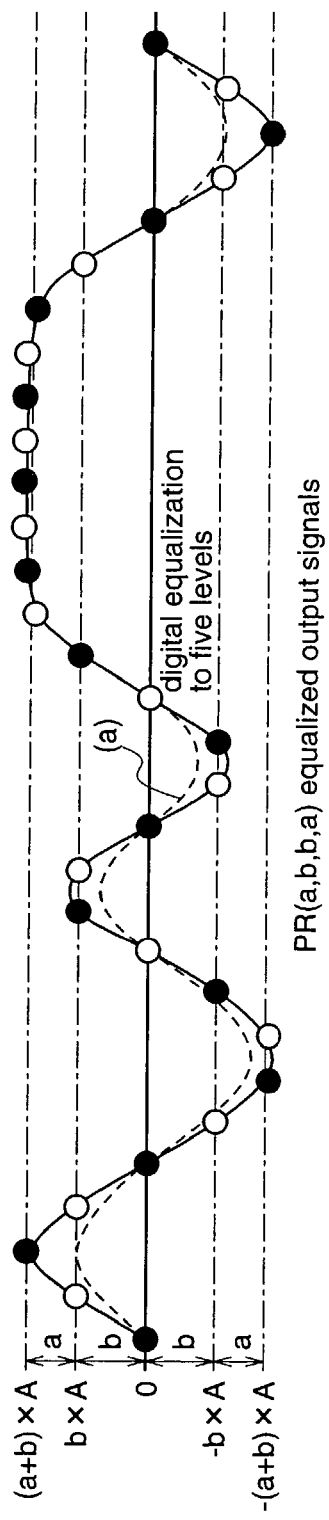

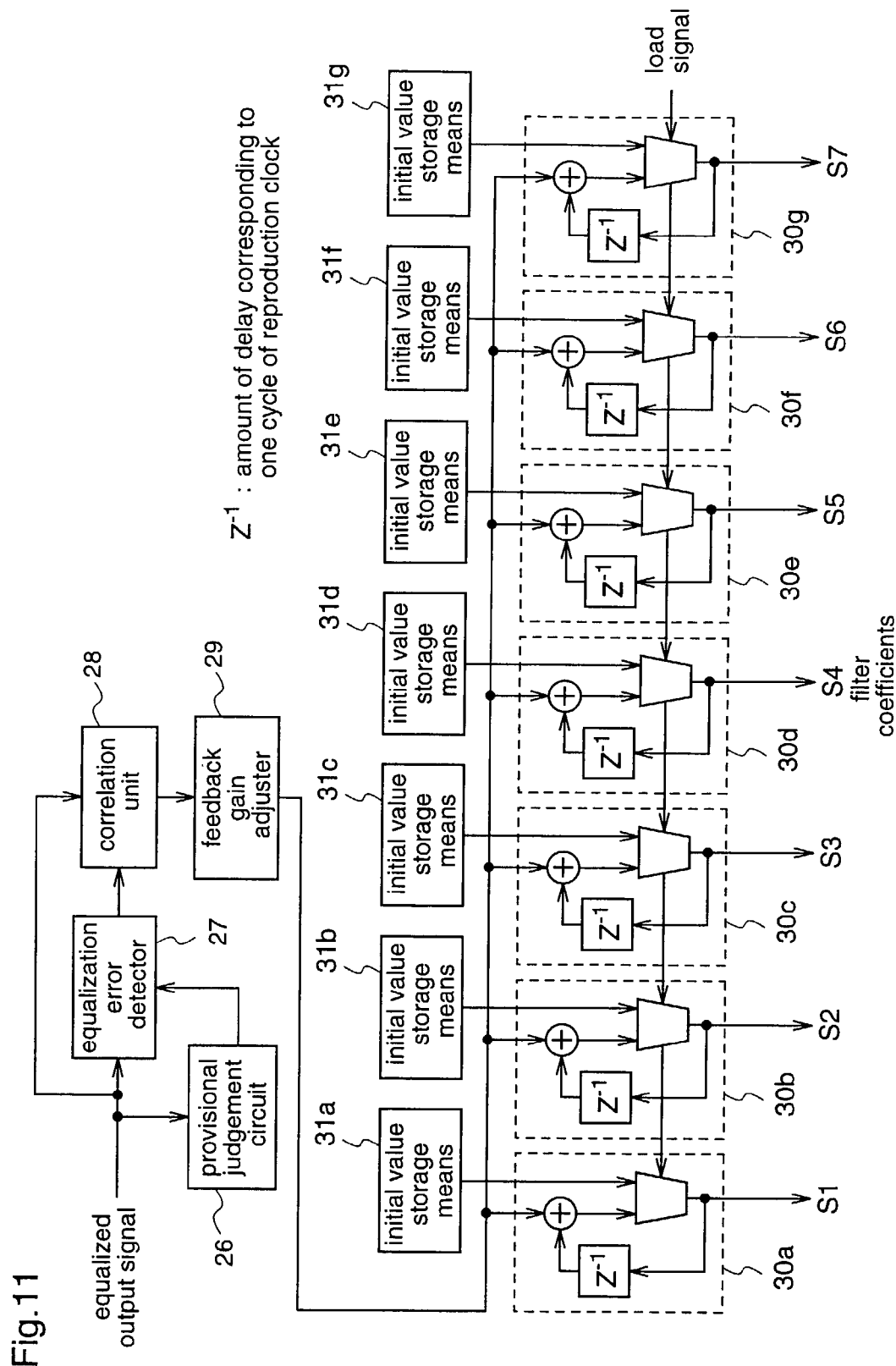

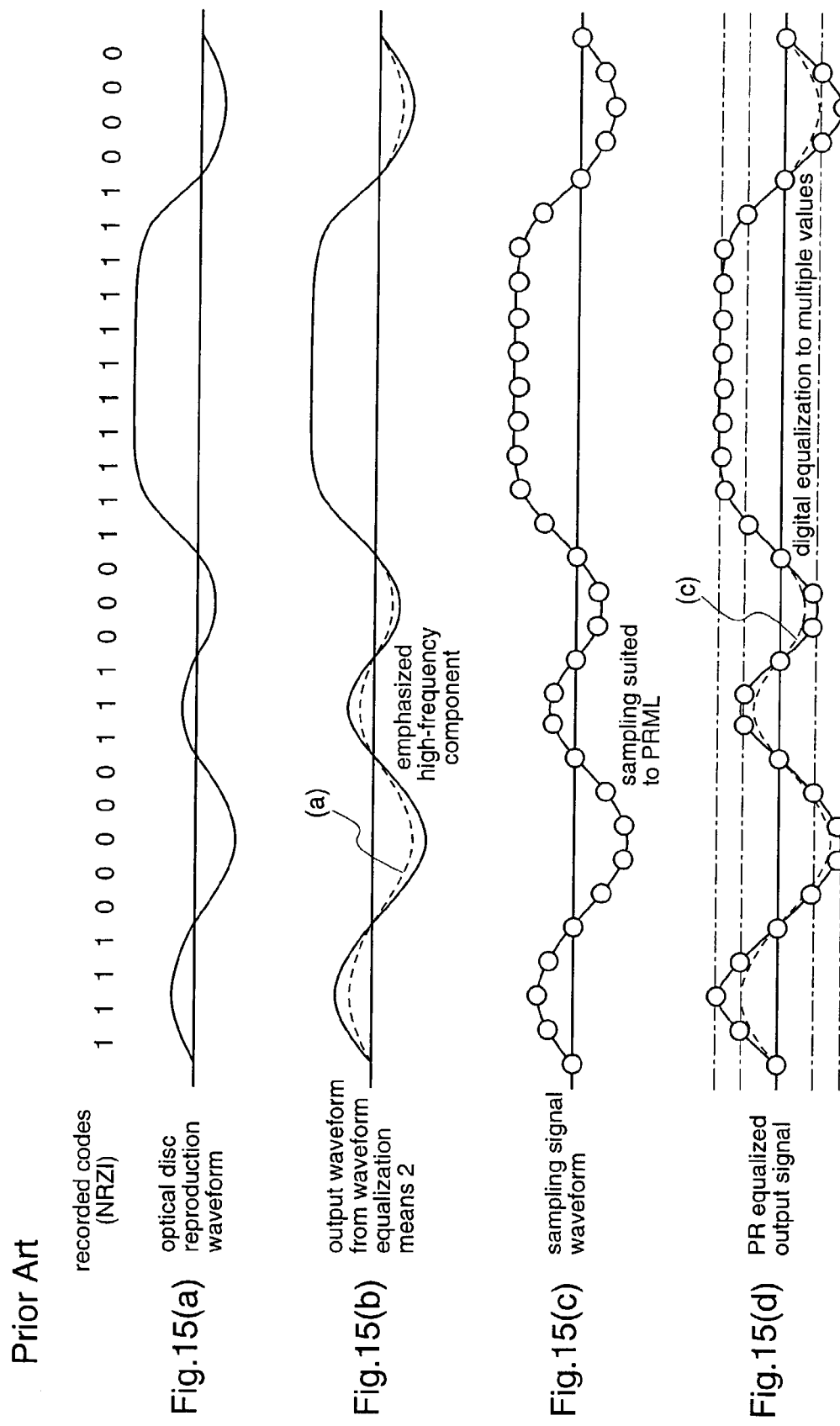

DIGITAL DATA REPRODUCTION APPARATUS

FIELD OF THE INVENTION

The present invention relates to a digital data reproduction apparatus and, more particularly, to a digital data reproduction apparatus employing a PRML (Partial Response Maximum Likelihood) signal processing method that is an effective method for high-density recording/reproduction in track direction, which apparatus can reduce power consumption against high-speed reproduction.

BACKGROUND OF THE INVENTION

As a method for recording digital data on optical recording mediums such as a CD (Compact Disc) and a DVD (Digital Versatile Disc), there has commonly been employed a method in which digital data to be recorded are subjected to mark width modulation to make the track recording density constant, thereby to make the recording density on the disc uniform. When performing reproduction and demodulation of the digital data recorded by the above-mentioned recording method, the phase of a clock component corresponding to a channel bit frequency of a reproduction signal is detected, and phase sync pull-in is carried out by using a phase-locked loop.

At this time, if the frequency of the clock component possessed by the reproduction signal is significantly different from the frequency of the clock generated by the phase-locked loop, there is a high possibility of imperfect phase sync pull-in or pseudo pull-in into different frequencies. In order to solve these problems and realize normal phase sync pull-in, a reproduction linear velocity cycle is detected on the basis of a specific pulse length or pulse interval included in the reproduction signal, and the rotation speed of the disc or the free-running frequency of the phase-locked loop is controlled according to the reproduction linear velocity cycle.

FIG. 14 is a block diagram illustrating the construction of a conventional digital data reproduction apparatus. This digital data reproduction apparatus is able to perform normal phase sync pull-in, and normal offset correction in the amplitude direction. With reference to FIG. 14, reference numeral 33 denotes an optical recording medium on which digital data, which are mark-width-modulated so as to make the track recording density constant, are recorded; reference numeral 34 denotes a reproduction means for reproducing the digital data recorded on the optical recording medium 33 to output an optical disc reproduction signal; reference numeral 2 denotes a waveform equalization means for emphasizing a high frequency component of the optical disc reproduction signal; reference numeral 3 denotes an analog-to-digital (A/D) converter for sampling the optical disc reproduction signal in which the high frequency component is emphasized, to convert the signal into a multi-bit sampling signal; reference numeral 35 denotes an offset correction means for correcting an offset component in the amplitude direction, which is included in the sampling signal; reference numeral 36 denotes a transversal filter for multi-valuing the sampling signal outputted from the offset correction means 35, by partial response equalization; reference numeral 37 denotes a tap weight coefficient setting means for supplying weight coefficients to taps constituting the transversal filter 36; reference numeral 38 denotes a Viterbi decoder for demodulating the output signal from the transversal filter 36 into binarized digital data; reference numeral 39 denotes a zero cross length detector for detecting a zero cross position where the output signal from the offset correction means 35 crosses the zero level, and counting the number of samples between two adjacent zero cross positions; reference numeral 40 denotes a frequency error detector for determining the amount of frequency error for generating a reproduction clock synchronized with the sampling signal, on the basis of the output from the zero cross length detector 39; reference numeral 41 denotes a phase comparator for detecting the amount of phase error between the clock component of the sampling signal and the reproduction clock, on the basis of the phase of the output signal from the offset correction means 35; reference numeral 42 denotes a frequency control loop filter for performing frequency control up to a region where the reproduction clock can be synchronized with the sampling clock, by using the amount of frequency error; reference numeral 43 denotes a phase control loop filter for performing phase control so that the reproduction clock is synchronized with the sampling signal, by using the amount of phase error; reference numerals 44a and 44b denote digital-to-analog (D/A) converters for converting the signals outputted from the phase control loop filter 43 and the frequency control loop filter 42 into analog signals, respectively; and reference numeral 45 denotes a voltage controlled oscillator (VCO) for generating a reproduction clock on the basis of the analog signals outputted from the D/A converters 44a and 44b.

Next, a description will be given of the operation of the conventional digital data reproduction apparatus constructed as described above, with reference to FIGS. 14 and 15(a)–15(d). FIGS. 15(a)–15(d) are diagrams illustrating recorded data (15(a)) and waveforms of output signals from the respective output stages (15(b)–15(d)) of the conventional digital data reproduction apparatus.

Conventionally, digital data as shown in FIG. 15(a) are recorded on the optical recording medium 33 so that the track recording density is kept constant. It is assumed that the recorded digital data are data in which the number of continuous 0 s or 1 s is restricted within a range from three to fourteen, like in the 8–16 modulation method. Since, in the optical disc reproduction signal obtained by reproducing the digital data with the reproduction means 34, interference occurs according to an increase in the recording density of the digital data along the track direction, a higher frequency component has more attenuation of amplitude, as shown in FIG. 15(a). So, the optical disc reproduction signal outputted from the reproduction means 34 is amplified by a preamplifier (not shown) and, thereafter, corrected by the waveform equalization means 2 so as to emphasize the higher frequency component. The optical disc reproduction signal in which the higher frequency component is emphasized is shown in FIG. 15(b). Next, the A/D converter 3 for converting an analog signal into a digital signal converts the optical disc reproduction signal shown in FIG. 15(b) into a multi-bit sampling signal. When the phase of the reproduction clock and the phase of the clock component of the sampling signal are synchronized with each other, sampling data (sampling signal) as shown in FIG. 15(c) are obtained. The sampling data shown in FIG. 15(c) are particularly suited to the PRML signal processing method.

The PRML signal processing method will be described as follows. In a reproduction system where the amplitude of a high frequency component is degraded and the signal-noise ratio is increased as the recording density is increased in the track recording direction, a partial response method for realizing a reproduction system that needs no high frequency component by intentionally adding a waveform interference is combined with a maximum likelihood decoding method for estimating a sequence of the maximum likelihood by probability calculation considering the waveform interference, thereby to improve the quality of reproduced data.

Next, the digital signal sampled by the A/D converter 3 is inputted to the offset correction means 35 to correct an offset component in the amplitude direction which is included in the sampling signal. Then, the offset-corrected sampling signal is subjected to partial response equalization by the transversal filter 36. As shown in FIG. 15(d), the partial-response-equalized signal is multi-valued. Further, the weight coefficients of the taps constituting the transversal filter 36 are determined by the tap weight coefficient setting means 37, using the LMS (Least Mean Square) algorithm which minimizes a root-mean-square value of an equalization error. The output signal from the transversal filter 36 is binarized and then demodulated to digital data, by the Viterbi decoder 38 that is a kind of a maximum likelihood decoder.

The reproduction clock to be used by the A/D converter 3 for sampling is controlled as follows.

The zero cross length detector 39 detects zero cross points at which the output signal from the offset correction means 35 crosses the zero level, and counts the number of samples between two adjacent zero cross points. The frequency error detector 40 detects a sync pattern length and a sync pattern detection cycle in a predetermined period of time by using the output from the zero cross length detector 39, and determines the amount of frequency error for performing frequency control of the reproduction clock. Then, the frequency control loop filter 42 performs frequency control up to a region where the reproduction clock can be synchronized with the clock component of the sampling signal, by using the amount of frequency error outputted from the frequency error detector 40, and the D/A converter 44b converts the output signal from the loop filter 42 into an analog signal.

On the other hand, the phase comparator 41 detects phase information of the sampling signal by using the output signal from the offset correction means 35, and determines the amount of phase difference for performing phase sync control between the reproduction clock and the sampling signal. Then, the phase control loop filter 43 performs phase control so that the reproduction clock is synchronized with the clock component of the sampling signal, by using the amount of phase difference outputted from the phase comparator 41, and the D/A converter 44a converts the output signal from the loop filter 43 into an analog signal.

Thereafter, the VCO 45 generates a reproduction clock synchronized with the sampling signal, on the basis of the output signal from the D/A converter 44b, which has been frequency-controlled so that the reproduction clock can be synchronized with the clock component of the sampling signal and then converted into an analog signal, and the output signal from the D/A converter 44a, which has been phase-controlled so that the reproduction clock is synchronized with the sampling signal and then converted into an analog signal.

Through the above-mentioned series of operations, the phase of the reproduction clock can be synchronized with the phase of the clock component of the digital data recorded on the optical disc 33. Hereinafter, the frequency of this clock component is referred to as a channel bit frequency. Further, since the PRML signal processing method is applicable, the digital data recorded on the optical disc 33 can be reproduced with high stability and high accuracy.

In the conventional digital data reproduction apparatus constructed as described above, the optical disc reproduction signal outputted from the optical recording medium 33 is sampled by the A/D converter 3 using the clock synchronized with the clock component of the optical disc reproduction signal, and then the sampling signal is subjected to the PRML signal processing to demodulate the digital data. Further, the PLL (Phase Locked Loop) circuit, the FIR (Finite Impulse Response) filter, and the Viterbi decoder, which are the components of the digital data reproduction apparatus, are operated with the channel bit frequency.

However, when data demodulation employing the PRML signal processing is carried out by using the reproduction clock synchronized with the clock component of the digital data recorded on the optical recording medium 33, since the frequency of the reproduction clock is increased during high-speed reproduction, power consumption of the digital circuit is undesirably increased depending on the frequency.

In order to prevent the undesired increase in power consumption during high-speed reproduction, data demodulation using a reproduction clock that is synchronized with half of the channel bit frequency is carried out. In the case where the frequency of the reproduction clock is half the channel bit frequency, loss of data occurs in the time direction when the optical disc reproduction signal is sampled by the A/D converter 3. That is, in the conventional method where only the sampling signal obtained by sampling with the reproduction clock is subjected to phase sync control and offset correction in the amplitude direction and then data demodulation is performed using the signal, the amount of data in the time direction is degraded due to that the frequency of the reproduction clock used for sampling is halved. Since this degradation causes degradation in performance during phase sync control or offset correction, sufficient reproduction performance cannot be maintained. Consequently, it is impossible for the conventional digital data reproduction apparatus to achieve both of a reduction in power consumption and an increase in reproduction performance, by only halving the frequency of the reproduction clock to be used for sampling.

SUMMARY OF THE INVENTION

The present invention is made to solve the above-described problems and has for its object to provide a digital data reproduction apparatus with improved performance in reproducing digital data recorded on an optical recording medium, and reduced power consumption.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a digital data reproduction apparatus for demodulating digital data from an optical recording medium on which digital data are recorded by recording codes having a constraint that at least three same codes should be continuous, which apparatus comprises: a half rate processing offset control means for performing offset correction control, while interpolating offset information in an amplitude direction for a missing signal, into a sampling signal which is obtained by sampling a reproduction signal that is obtained by playing the optical recording medium, with a reproduction clock whose frequency is half a channel bit frequency; a half rate processing phase sync control means for performing phase sync control while interpolating phase error information of the missing signal, into a signal which is obtained by the half rate processing offset control means; a half rate processing adaptive equalization means for performing partial response adaptive equalization on the signal which has been subjected to the offset correction in the amplitude direction and the phase synchronization by the half rate processing offset control means and the half rate processing phase sync control means, respectively; and a half rate processing maximum likelihood decoding means for performing decoding adaptive to the type of partial response, on the partial-response-adaptive-equalized signal that is outputted from the half rate processing adaptive equalization means. Therefore, data demodulation can be carried out using the reproduction clock whose frequency is half the channel bit frequency, whereby power consumption of the digital data reproduction apparatus is reduced.

According to a second aspect of the present invention, in the digital data reproduction apparatus according to the first aspect, the half rate processing adaptive equalization means comprises: a first half rate processing adaptive equalization filter for performing partial response adaptive equalization on the sampling signal which is sampled with the reproduction clock; and a second half rate processing adaptive equalization filter for interpolating, by Nyquist interpolation, a signal which is missing at performing sampling to obtain the sampling signal. Therefore, an interpolation signal, which is missing at performing sampling with the reproduction clock, can be correctly restored, whereby the performance of digital data demodulation as high as the performance in the case where sampling is carried out with a clock of the channel bit frequency, is maintained.

According to a third aspect of the present invention, in the digital data reproduction apparatus according to the first aspect, the half rate processing phase sync control means includes a linear interpolation filter for interpolating a signal which is missing at performing sampling to obtain the sampling signal. Therefore, phase sync control can be carried out by using not only the sampling signal which is sampled with the reproduction clock whose frequency is half the channel bit frequency but also the interpolated signal, whereby the phase sync performance is assured.

According to a fourth aspect of the present invention, in the digital data reproduction apparatus according to the first aspect, the half rate processing phase sync control means includes a Nyquist interpolation filter for interpolating a signal which is missing at performing sampling to obtain the sampling signal. Therefore, the phase sync performance is improved as compared with the case where a linear interpolation filter is employed.

According to a fifth aspect of the present invention, in the digital data reproduction apparatus according to the fourth aspect, the Nyquist interpolation filter is constituted by a finite impulse response filter having a minimum number of taps required for maintaining accuracy. Therefore, the circuit scale of the Nyquist interpolation filter is minimized, whereby the amount of delay is reduced.

According to a sixth aspect of the present invention, in the digital data reproduction apparatus according to any of the third to fifth aspects, the half rate processing phase sync control means determines the phase error information on the basis of the polarity of codes of a sum signal which is obtained by adding the sampling signal, and the signal that is outputted from the Nyquist interpolation filter or the linear interpolation filter. Therefore, a signal indicating correct phase error information can be obtained from the sampling signal and the interpolation signal, whereby stable phase sync control is achieved.

According to a seventh aspect of the present invention, in the digital data reproduction apparatus according to the first aspect, the half rate processing offset control means includes a linear interpolation filter for interpolating a signal which is missing at performing sampling to obtain the sampling signal. Therefore, offset correction can be carried out by using not only the sampling signal which is sampled with the reproduction clock whose frequency is half the channel bit frequency but also the interpolated signal, whereby the offset correction performance is assured.

According to an eighth aspect of the present invention, in the digital data reproduction apparatus according to the first aspect, the half rate processing offset control means includes a Nyquist interpolation filter for interpolating a signal which is missing at performing sampling to obtain the sampling signal. Therefore, offset correction can be carried out with higher accuracy as compared with the case where a linear interpolation filter is employed.

According to a ninth aspect of the present invention, in the digital data reproduction apparatus according to the eighth aspect, the Nyquist interpolation filter is constituted by a finite impulse response filter having a minimum number of taps required for maintaining accuracy. Therefore, the circuit scale of the Nyquist interpolation filter is minimized, whereby the amount of delay is reduced.

According to a tenth aspect of the present invention, in the digital data reproduction apparatus according to any of the seventh to ninth aspects, the half rate processing offset control means comprises: a zero cross position detection means for detecting a zero cross position where the sampling signal crosses the zero level, and a zero cross position of an interpolation signal which is outputted from the linear interpolation filter or the Nyquist interpolation filter, in parallel with each other; and an offset information selection means for determining offset information, on the basis of the polarity of codes of a sum signal which is obtained by adding the zero cross position of the sampling signal and the zero cross position of the interpolation signal. Therefore, a signal indicating correct offset information can be obtained from the sampling signal and the interpolation signal, whereby stable offset correction control is achieved.

According to an eleventh aspect of the present invention, in the digital data reproduction apparatus according to the first aspect, the half rate processing offset control means comprises: an interpolation means for interpolating a signal which is missing at performing sampling to obtain the sampling signal; a polarity value output means for adding "1" when the polarity of codes of a sum signal, which is obtained by adding the sampling signal and the interpolation signal outputted from the interpolation means for an arbitrary period of time, is positive, and subtracting "1" when the polarity is negative; and an accumulation means for accumulating the output result from the polarity value output means for a predetermined period of time that is set by a counter. Therefore, even when the sampling signal is out of synchronization with the reproduction clock, offset correction can be carried out.

According to a twelfth aspect of the present invention, there is provided a digital data reproduction apparatus for demodulating digital data from an optical recording medium on which digital data are recorded by recording codes having a constraint that at least three same codes should be continuous, which apparatus comprises: a half rate processing offset control means for performing offset correction control, while interpolating offset information in an amplitude direction for a missing signal, into a sampling signal which is obtained by sampling a reproduction signal that is obtained by playing the optical recording medium, with a reproduction clock whose frequency is half a channel bit frequency; a first half rate processing adaptive equalization filter for performing partial response adaptive equalization on the signal which has been subjected to the offset control in the amplitude direction and the phase synchronization by the half rate processing offset control means and a half rate processing phase sync control means, respectively; a second half rate processing adaptive equalization filter for interpolating, by Nyquist interpolation, a signal which is missing at performing sampling to obtain the sampling signal; a half rate processing phase sync control means for performing phase sync control on the sampling signal, on the basis of the signals obtained by the first and second half rate processing adaptive equalization means; and a half rate processing maximum likelihood decoding means for performing decoding adaptive to the type of partial response, on the partial-response-adaptive-equalized signal which is outputted from the half rate processing adaptive equalization means. Therefore, phase error information can be generated on the basis of the equalized output signal that is suited to the partial response, whereby reliability of phase sync control is improved.

According to a thirteenth aspect of the present invention, in the digital data reproduction apparatus according to the twelfth aspect, the half rate processing offset control means performs offset correction in the amplitude direction, on the basis of the signals obtained by the first and second half rate processing adaptive equalization means. Therefore, offset information can be generated on the basis of the equalized output signal that is suited to the partial response, whereby reliability of offset correction control is improved.

BRIEF DESCRIPTION OF THE DRAWINGS

FIGS. 9(a)–9(c) are diagrams for explaining a difference between a PR(a,b,b,a) equalization method that is realized by a half rate processing adaptive equalization means included in the digital data reproduction apparatus according to the first or second embodiment, and a general binary discrimination method.

FIG. 11 is a block diagram illustrating the construction of a filter coefficient learning means that is a component of the half rate processing adaptive equalization means included the digital data reproduction apparatus according to the first or second embodiment.

FIGS. 15(a)–15(d) are diagrams illustrating recorded data (FIG. 15(a)), and waveforms of output signals at the respective output stages (FIGS. 15(b)–15(d)) of the conventional digital data reproduction apparatus.

DETAILED DESCRIPTION OF THE PREFERRED EMBODIMENTS

[Embodiment 1]

First of all, a digital data reproduction apparatus as defined in claims 1 to 11 will be described as a first embodiment of the present invention, with reference to the drawings.

The digital data reproduction apparatus according to the first embodiment performs PRML (Partial Response Maximum Likelihood) signal processing at a frequency that is half the channel bit frequency, restores interpolation signals which are missing in the time direction, by using a linear interpolation filter or a Nyquist interpolation filter, and performs offset correction control and phase sync control, whereby digital data reproduction performance is maintained with no degradation.

Figure 1:
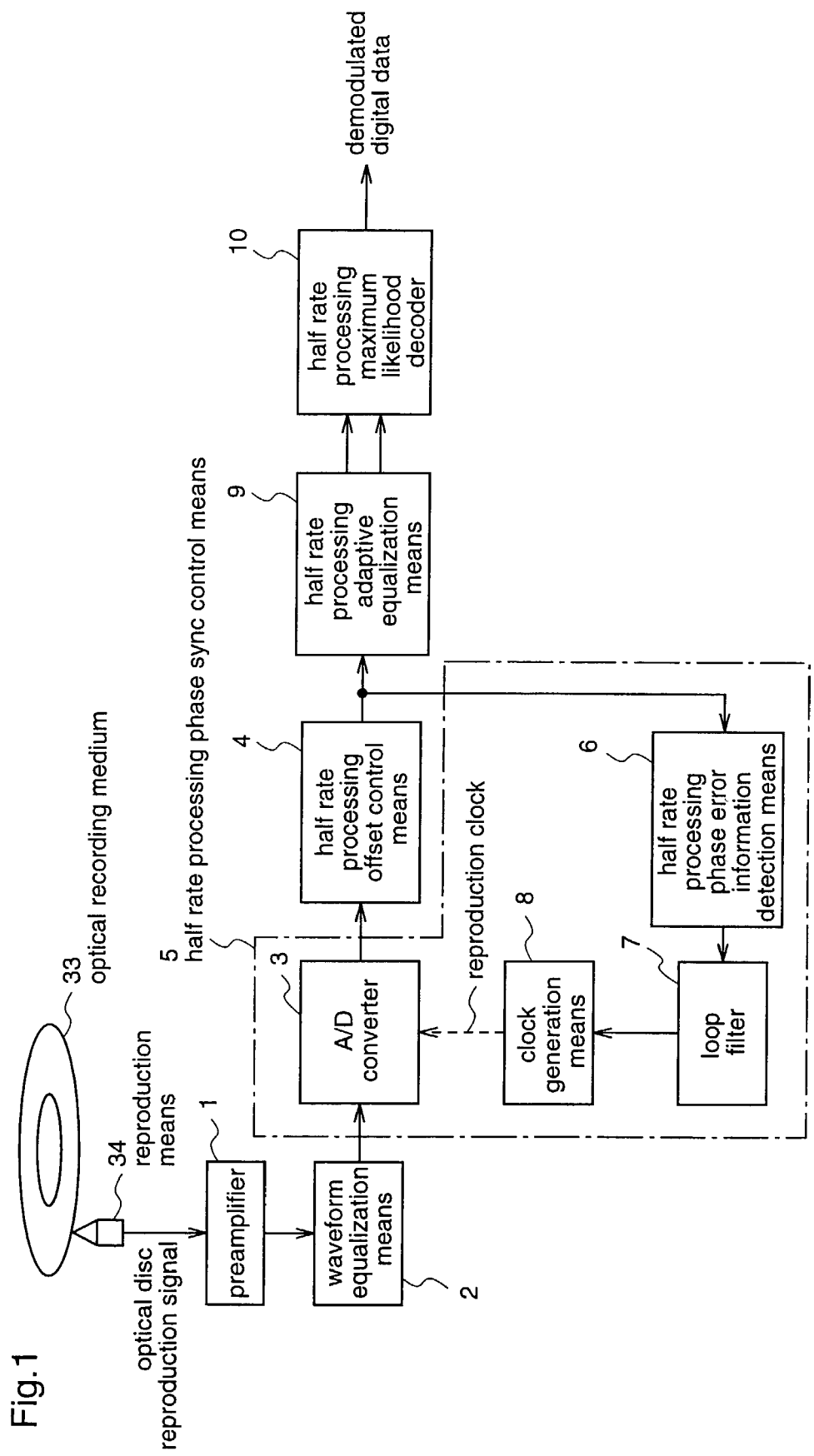
FIG. 1 is a block diagram illustrating the construction of a digital data reproduction apparatus according to a first embodiment of the present invention.
Figure 2:
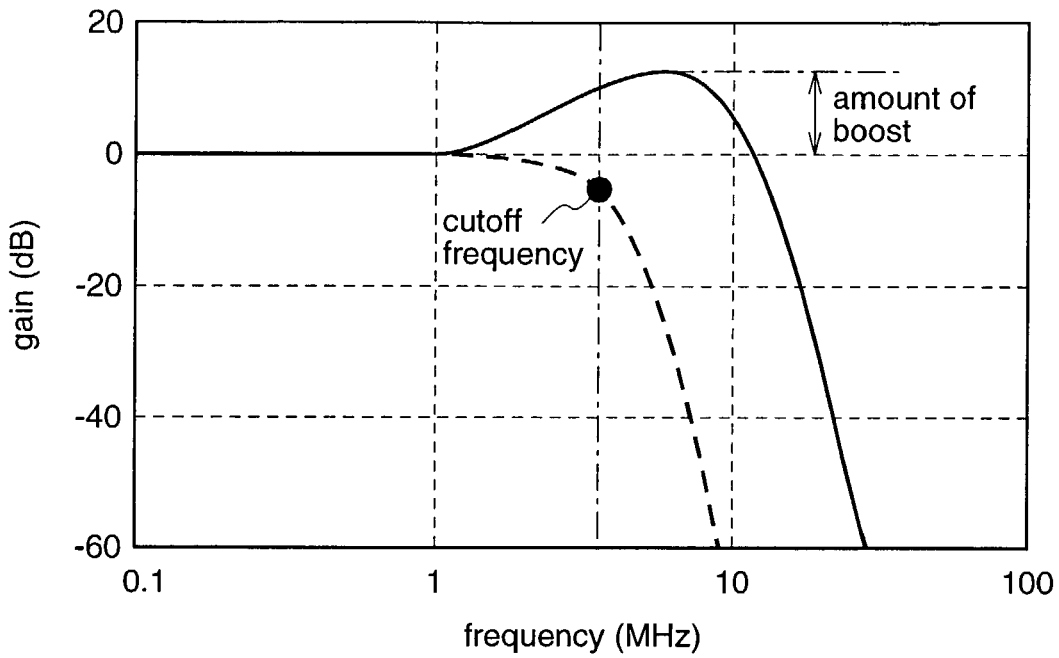
FIG. 2 is a diagram for explaining the frequency characteristics of a high-order ripple filter.

FIG. 1 is a block diagram illustrating the construction of the digital data reproduction apparatus according to the first embodiment of the present invention.

In FIG. 1, reference numeral 33 denotes an optical recording medium on which digital data, which have been subjected to mark width modulation to make the track recording density constant, are recorded; reference numeral 34 denotes a reproduction means for reproducing the digital data recorded on the optical recording medium 33 to output an optical disc reproduction signal; reference numeral 1 denotes a preamplifier for amplifying the optical disc reproduction signal; reference numeral 2 denotes a waveform equalization means for emphasizing a high frequency component of the optical disc reproduction signal which is amplified by the preamplifier 1; reference numeral 3 denotes an A/D converter for sampling the optical disc reproduction signal in which the high frequency component is emphasized, with a reproduction clock whose frequency is half the channel bit frequency, to convert the optical disc reproduction signal into a multi-bit sampling signal; reference numeral 4 denotes an offset control means for half rate processing (hereinafter referred to as half rate processing offset control means), which corrects an offset component in the amplitude direction, included in the sampling signal; reference numeral 5 denotes a phase sync control means for half rate processing (hereinafter referred to as half rate processing phase sync control means), which generates a sampling signal that is synchronized with the phase of one-half frequency of a clock component included in the optical disc reproduction signal; reference numeral 6 denotes a phase error information detection means for half rate processing (hereinafter referred to as half rate processing phase error information detection means), which restores an interpolation signal that is missing during sampling, and detects phase error information for generating a reproduction clock, on the basis of the interpolation signal and the sampling signal; reference numeral 7 denotes a loop filter for smoothing the phase error information that is generated by the half rate processing phase error information detection means 6; reference numeral 8 denotes a clock generation means for generating a reproduction clock on the basis of the phase error information that is smoothed by the loop filter 7; reference numeral 9 denotes an adaptive equalization means for half rate processing (hereinafter referred to as half rate processing adaptive equalization means), which restores an interpolation signal that is missing during sampling, and performs partial response equalization on the sampling signal that is corrected by the half rate processing offset control means 4; and reference numeral 10 denotes a maximum likelihood decoder for half rate processing (hereinafter referred to as half rate processing maximum likelihood decoder), which performs data demodulation on the partial-response-equalized output signal.

Hereinafter, the operation of the digital data reproduction apparatus according to the first embodiment will be described with reference to FIGS. 1 to 12.

The reproduction means 34 reproduces the digital data recorded on the optical recording medium 33 to output an optical disc reproduction signal. Then, the preamplifier 1 emphasizes the amplitude of the optical disc reproduction signal, and the waveform equalization means 2 corrects the optical disc reproduction signal so as to emphasize a high frequency component of the signal.

The waveform equalization means 2 is constituted by a filter that can arbitrarily set an amount of boost and a cut-off frequency. For example, the waveform equalization means 2 may be constituted by a high-order ripple filter having frequency characteristics shown by a solid line in FIG. 2. When no boost is carried out, the high-order ripple filter has characteristics shown by a dotted line in FIG. 2.

Figure 3:
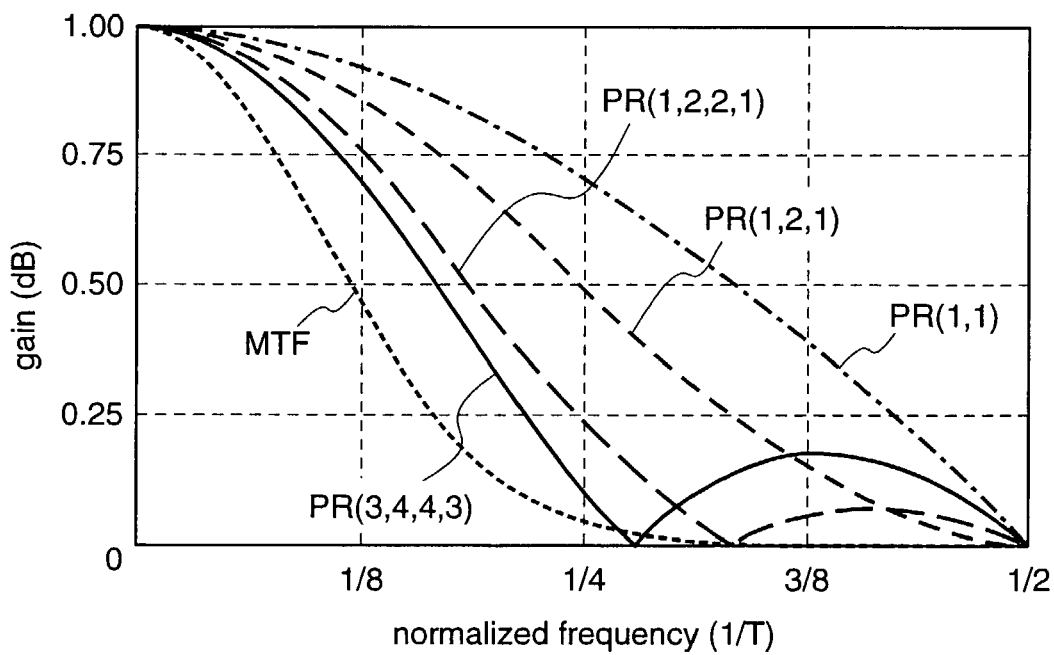
FIG. 3 is a diagram illustrating the frequency characteristics and MTF characteristics of various kinds of partial response methods.

Then, the A/D converter 3 samples the optical disc reproduction signal in which the high frequency component is emphasized by the waveform equalization means 2, by using the reproduction clock which is generated by the clock generation means 8 so as to have a frequency that is half the channel bit frequency, thereby generating a multi-bit sampling signal. At this time, according to the sampling theorem, demodulation of the digital data which are sampled by the A/D converter 3 is theoretically possible only when the codes of the digital data to be demodulated are codes whose minimum run length is restricted to 2 like 8–16 modulated codes that are used for a DVD, and the MTF (Mutual Transfer Function) characteristics as optical reproduction characteristics are as shown in FIG. 3 in which the signals distributed in a band region corresponding to about ¼ or less of the channel bit frequency are sampled with a reproduction clock having a frequency component that is half the channel bit frequency. By utilizing this theorem, the present invention is characterized by that the reproduction clock is generated with reference to half of the channel bit frequency.

Next, the multi-bit digital signal obtained by sampling is inputted to the half rate processing offset control means 4, wherein an offset component in the amplitude direction, which is included in the sampling signal, is corrected.

Figure 4A:
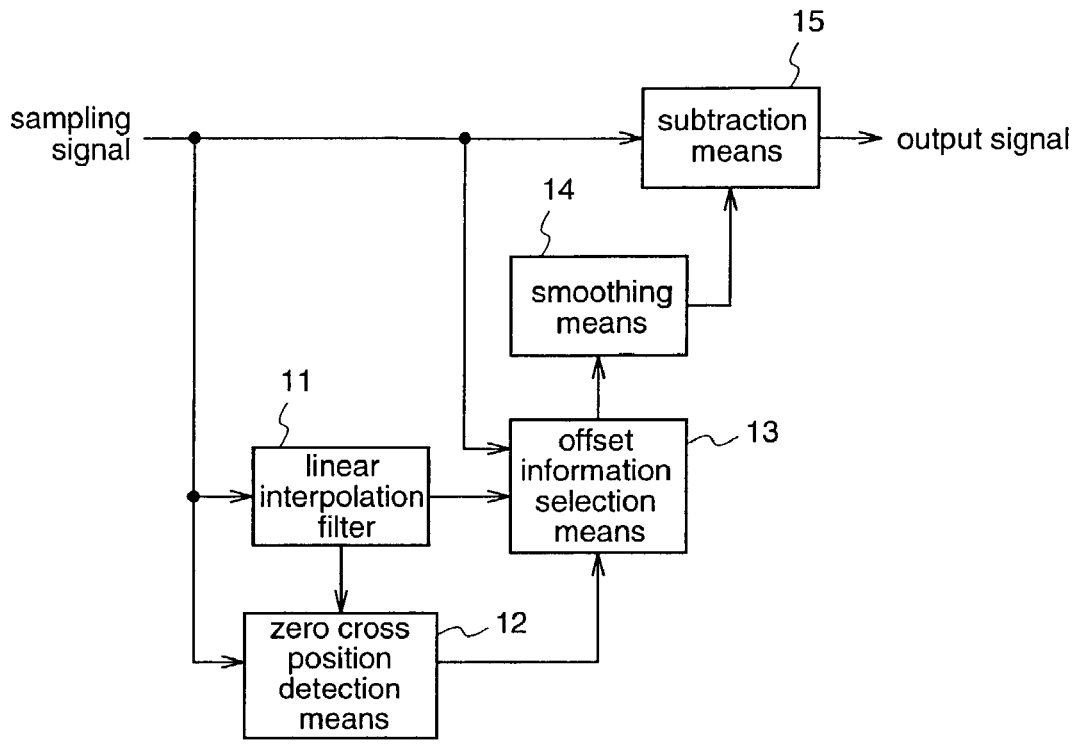
FIG. 4(a) is a block diagram illustrating the construction of a half rate processing offset control means using a linear interpolation filter, which means is included in the digital data reproduction apparatus according to the first embodiment.
Figure 4B:
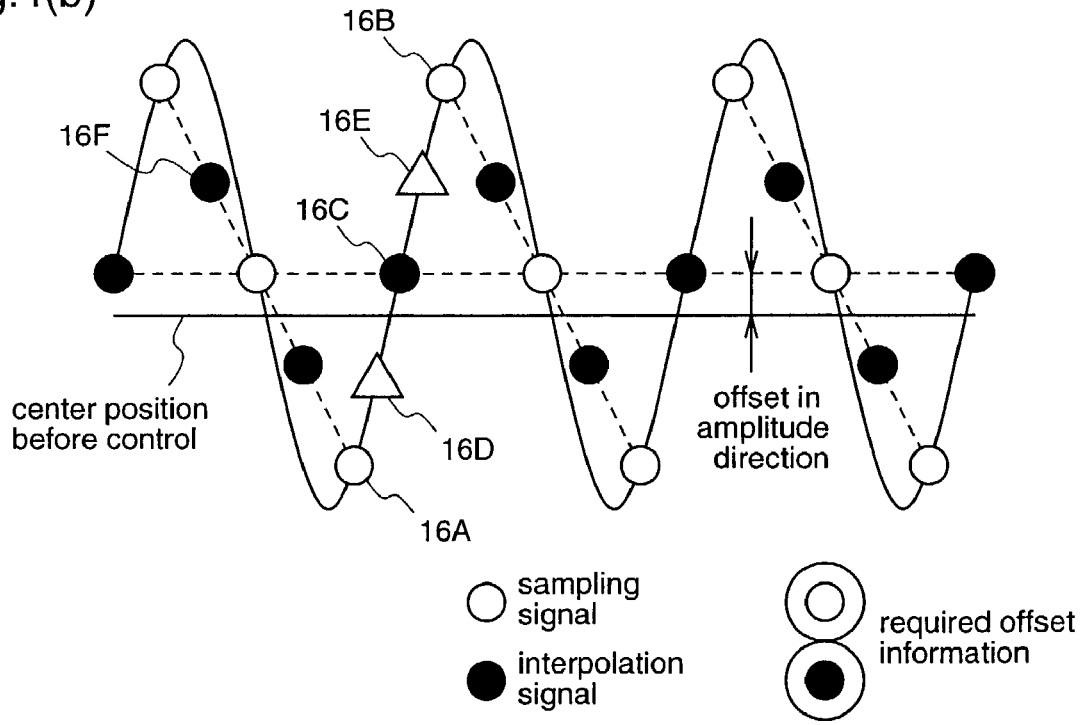
FIG. 4(b) is a diagram for explaining the principle of linear interpolation.

The half rate processing offset control means 4 may have the construction and principle shown in FIGS. 4(*a*) and 4(*b*), respectively. FIG. 4(*a*) is a block diagram illustrating an example of a half rate processing offset control means 4 using a linear interpolation filter, and FIG. 4(*b*) is a diagram for explaining the principle of linear interpolation.

The half rate processing offset control means 4 shown in FIG. 4(*a*) comprises a linear interpolation filter 11 for performing linear interpolation to restore interpolation signals which are missing from the sampling signals generated by the A/D converter 3; a zero cross position detection means 12 for specifying signals existing at a zero cross position that crosses a center position, from the sampling signals and the interpolation signals; an offset information selection means 13 for selecting offset information signals indicating offsets in the amplitude direction, from the sampling signals and the interpolation signals, on the basis of the signals specified by the zero cross position detection means 12; a smoothing means 14 for smoothing the offset information signals selected by the offset information selection means 13; and a subtraction means 15 for correcting the offsets of the sampling signals on the basis of the offset information signals smoothed by the smoothing means 14.

To be specific, as shown in FIG. 4(*b*), the linear interpolation filter 11 restores interpolation signals (black circles (●) 16C, 16F, . . . ) which are the components in the time direction, missing from the optical disc reproduction signal of the channel bit frequency, on the basis of sampling signals (white circles (○) 16A, 16B, . . . ) which are obtained by sampling using the reproduction clock whose frequency is half the channel bit frequency. Then, the zero cross position detection means 12 specifies signals existing at the zero cross position before control, from the sampling signals and the interpolation signals, and the offset information selection means 13 selects offset information signals that can be offset information in the amplitude direction, from the sampling signals and the interpolation signals, thereby performing offset correction control. At this time, the zero cross position detection means 12 may specify the signals at the zero cross position, which accurately indicate offset information in the amplitude direction, by utilizing that the polarity of codes of a signal 16D which is obtained by adding and averaging the adjacent sampling signal 16A and interpolation signal 16C is different from the polarity of codes of a signal 16E which is obtained by adding and averaging the adjacent interpolation signal 16C and sampling signal 16B. Further, when the linear interpolation filter 11 is used, some restored interpolation signals are positioned outside the actual waveform, like an interpolation signal 16F. However, since these signals are treated as signals having no bearing on the offset information in the amplitude direction, these signals hardly affect the signal selection by the offset information selection means 13. The output signals from the offset information selection means 13 are smoothed by the smoothing means 14. Thereafter, the subtraction means 15 subtracts the smoothed signals from the sampling signals, thereby reducing the offset components in the amplitude direction, which are included in the sampling signals.

Figure 5A:
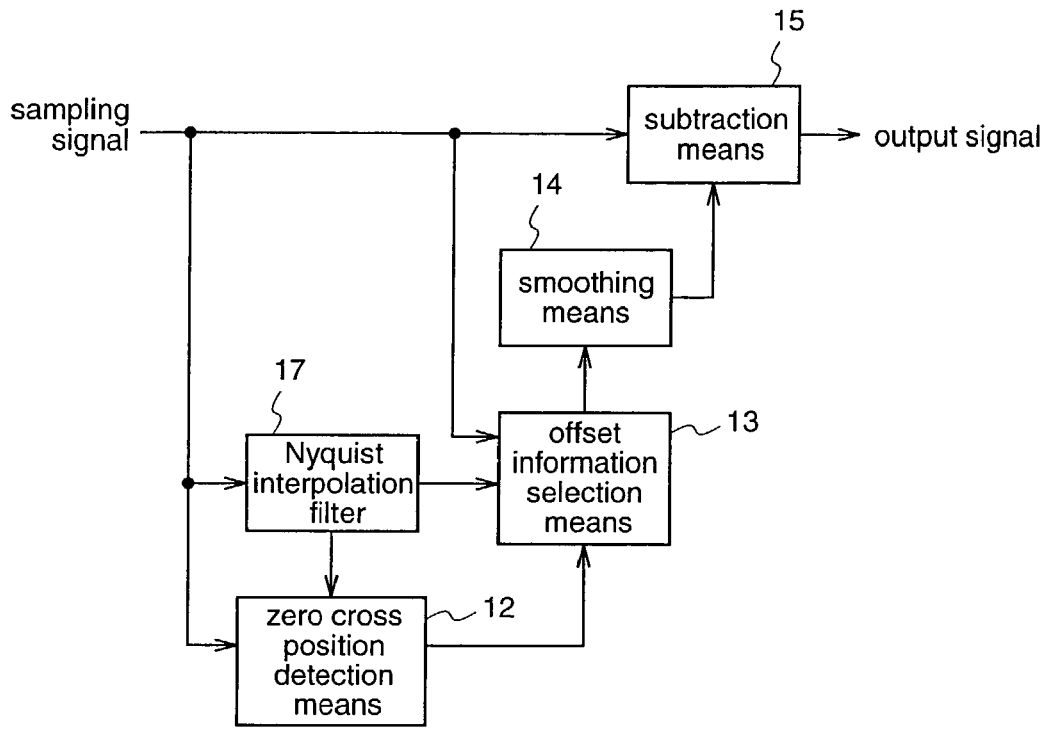
FIG. 5(a) is a block diagram illustrating the construction of a half rate processing offset control means using a Nyquist interpolation filter, which means is included in the digital data reproduction apparatus according to first or second embodiment.
Figure 5B:
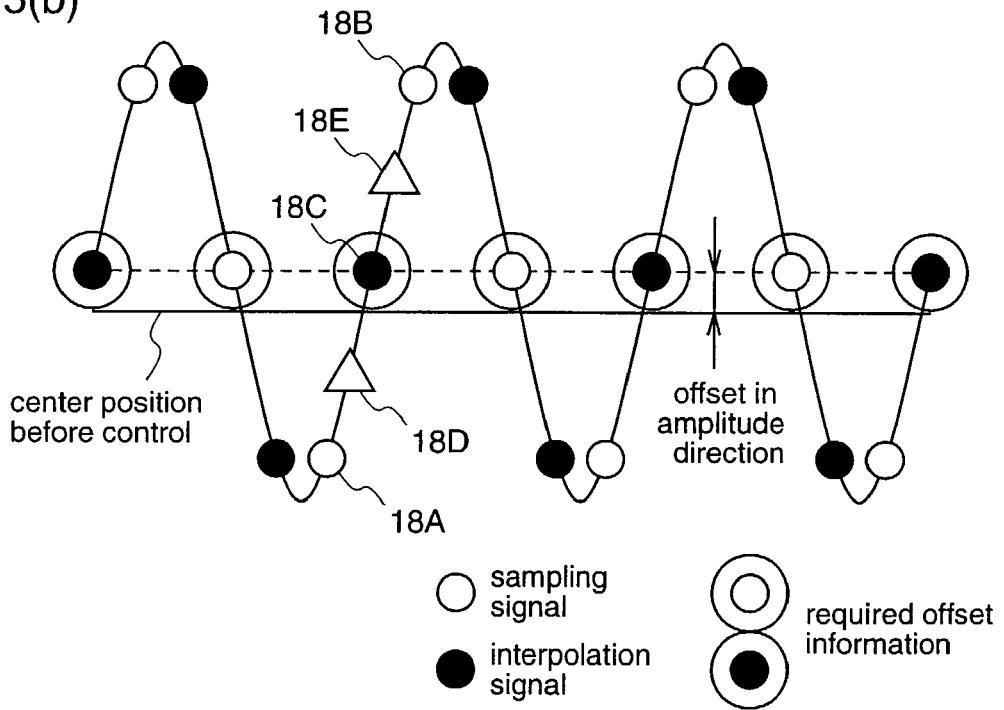
FIG. 5(b) is a diagram for explaining the principle of Nyquist interpolation.

The half rate processing offset control means 4 may have the construction and principle as shown in FIGS. 5(a) and 5(b). FIG. 5(a) is a block diagram illustrating an example of a half rate processing offset control means 4 using a Nyquist interpolation filter, and FIG. 5(b) is a diagram for explaining the principle of Nyquist interpolation.

The half rate processing offset control means 4 shown in FIG. 5(a) comprises a Nyquist interpolation filter 17 for performing Nyquist interpolation to restore interpolation signals which are missing from the sampling signals generated by the A/D converter 3; a zero cross position detection means 12 for specifying signals existing at the zero cross position, from the sampling signals and the interpolation signals; an offset information selection means 13 for selecting offset information signals indicating offsets in the amplitude direction, from the sampling signals and the interpolation signals, on the basis of the signals specified by the zero cross position detection means 12; a smoothing means 14 for smoothing the offset information signals selected by the offset information selection means 13; and a subtraction means for correcting the offsets of the sampling signals on the basis of the offset information signals smoothed by the smoothing means 14.

To be specific, as shown in FIG. 5(b), the Nyquist interpolation filter 17 restores the interpolation signals (black circles (●) 18C, . . . ) which are the components in the time direction, missing from the optical disc reproduction signal of the channel bit frequency, on the basis of the sampling signals (white circles (○) 18A, 18B, . . . ) which are obtained by sampling using the reproduction clock whose frequency is half the channel bit frequency. Then, the zero cross position detection means 12 specifies signals existing at the zero cross position before control, from the sampling signals and the interpolation signals, and the offset information selection means 13 selects signals that can be offset information in the amplitude direction, from the sampling signals and the interpolation signals, thereby performing offset correction control. At this time, the zero cross position detection means 12 may specify the signals at the zero cross position, which accurately indicate offset information in the amplitude direction, by utilizing that the polarity of codes of a signal 18D that is obtained by adding and averaging the adjacent sampling signal 18A and interpolation signal 18C is different from the polarity of codes of a signal 18E that is obtained by adding and averaging the adjacent interpolation signal 18C and sampling signal 18B. Further, when the Nyquist interpolation filter 17 is used, the restored interpolation signals are hardly positioned outside the actual waveform, the accuracy in offset correction control is improved as compared with the case of using the linear interpolation filter 11. The output signals from the offset information selection means 13 are smoothed by the smoothing means 14. Thereafter, the subtraction means 15 subtracts the smoothed signals from the sampling signals, thereby reducing the offset components in the amplitude direction which are included in the sampling signals.

Figure 6:
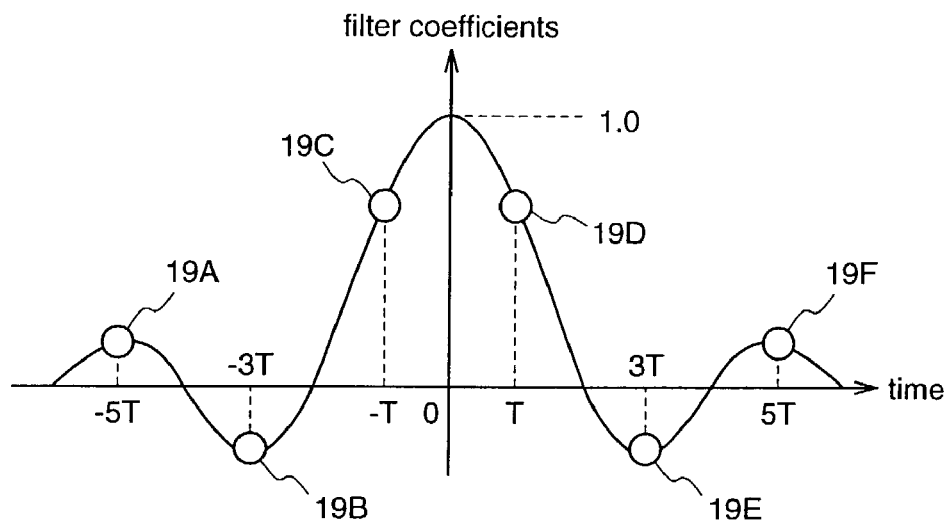
FIG. 6 is a diagram for explaining the operation principle of the Nyquist interpolation filter which is included in the digital data reproduction apparatus according to the first or second embodiment.

The Nyquist interpolation filter 17 may have Nyquist characteristics as shown in FIG. 6. The Nyquist interpolation filter 17 having the characteristics shown in FIG. 6 can be constituted by, for example, a FIR filter which employs such filter coefficients that reflect the values of white circles (○) 19A~19F having an interval (cycle) that is double the channel bit cycle. Thereby, the signals which are missing in the time direction can be restored.

Figure 7:
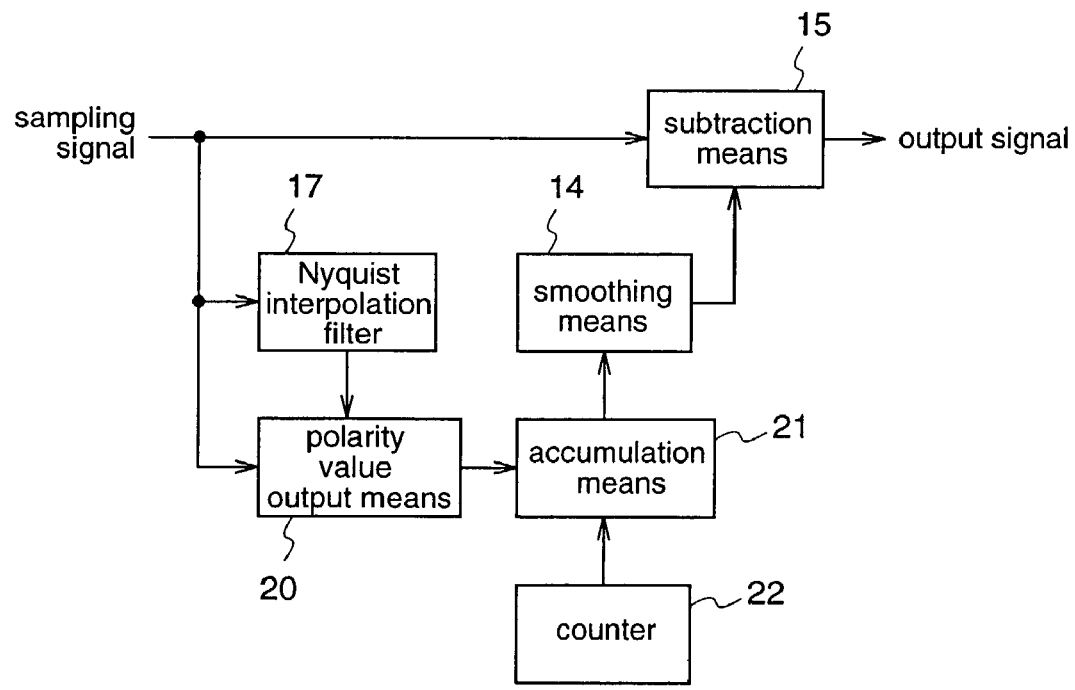
FIG. 7 is a block diagram illustrating another example of a half rate processing offset control means using a Nyquist interpolation filter, which means is included in the digital data reproduction apparatus according to the first embodiment.

The half rate processing offset control means 4 may be constructed as shown in FIG. 7. FIG. 7 is a block diagram illustrating another example of a half rate processing offset control means 4 employing a Nyquist interpolation filter.

The digital data recorded on the optical recording medium 33 are coded so as to suppress the low frequency component. Therefore, the digital data have characteristics as follows. That is, when accumulation is carried out, in an arbitrary period of time, such that 1 is added to "1" of binary digital data which are recorded at arbitrary intervals while 1 is subtracted from "0" of the recorded binary digital data, the accumulation result approaches zero evenly. The half rate processing offset control means shown in FIG. 7 utilizes the characteristics.

The half rate processing offset control means 4 shown in FIG. 7 comprises a Nyquist interpolation filter 17 for performing Nyquist interpolation to restore the interpolation signals which are missing from the sampling signals generated by the A/D converter 3; a polarity value output means 20 for assigning a polarity to a signal that is obtained by adding and averaging adjacent sampling signal and interpolation signal; an accumulation means 21 for accumulating the output signals from the polarity value output means 20 for a period of time that is set by a counter 22; a smoothing means 14 for smoothing the output signals from the accumulation means 21; and a subtraction means 15 for correcting the offsets of the sampling signals on the basis of the output signals from the smoothing means 14.

To be specific, the Nyquist interpolation filter 17 restores the interpolation signals (black circles (●) 18C, . . . shown in FIG. 5) which are the components in the time direction, missing from the optical disc reproduction signal of the channel bit frequency, on the basis of the sampling signals (white circles (○) 18A, 18B, . . . shown in FIG. 5) which are obtained by sampling using the reproduction clock whose frequency is half the channel bit frequency. Then, the polarity value output means 20 assigns either "−1" or "1" to a signal that is obtained by averaging adjacent sampling signal and interpolation signal. That is, a polarity "−1" is assigned to the signal 18D which is obtained by averaging the sampling signal 18A and the interpolation signal 18C, a polarity "1" is assigned to the signal 18E which is obtained by averaging the interpolation signal 18C and the sampling signal 18B, and the remaining components are subjected to similar processing. The result outputted from the polarity value output means 20 is accumulated by the accumulation means 21 for an arbitrary period of time that is set by the counter 22. The result of accumulation is smoothed by the smoothing means 14. Then, the subtraction means 15 subtracts the smoothed signals from the sampling signals, thereby reducing the offset components in the amplitude direction, which are included in the sampling signals. Since this method is effective even when the sampling signal is not synchronized with the phase of one-half frequency of the clock component included in the sampling signal, it is desirably applied to the case where phase synchronization of the sampling signals is not performed.

In order to realize the PRML signal processing, it is necessary to generate sampling signals which are synchronized with the phase of one-half frequency of the clock component included in the optical disk reproduction signal. The half rate processing phase control means 5 for realizing the PRML signal processing may be constructed as follows.

The half rate processing phase error information detection means 6 is supplied with the sampling signals which have been sampled by the A/D converter 3 and then offset-corrected by the half rate processing offset control means 4. Then, the half rate processing phase error information detection means 6 restores the interpolation signals which are missing in the time direction, on the basis of the inputted sampling signals, and detects phase error information using the sampling signals and interpolation signals. Then, the loop filter 7 smoothes the phase error information generated by the half rate processing phase error information detection means 6, and the clock generation means 8 controls the phase error information so that the phase of the reproduction clock is synchronized with the phase of one-half frequency of the clock component of the optical disc reproduction signal. In this way, multi-bit sampling signals which are synchronized with the phase of one-half frequency of the clock component possessed by the optical disc reproduction signal are generated, whereby the PRML signal processing is realized.

Figure 8A:
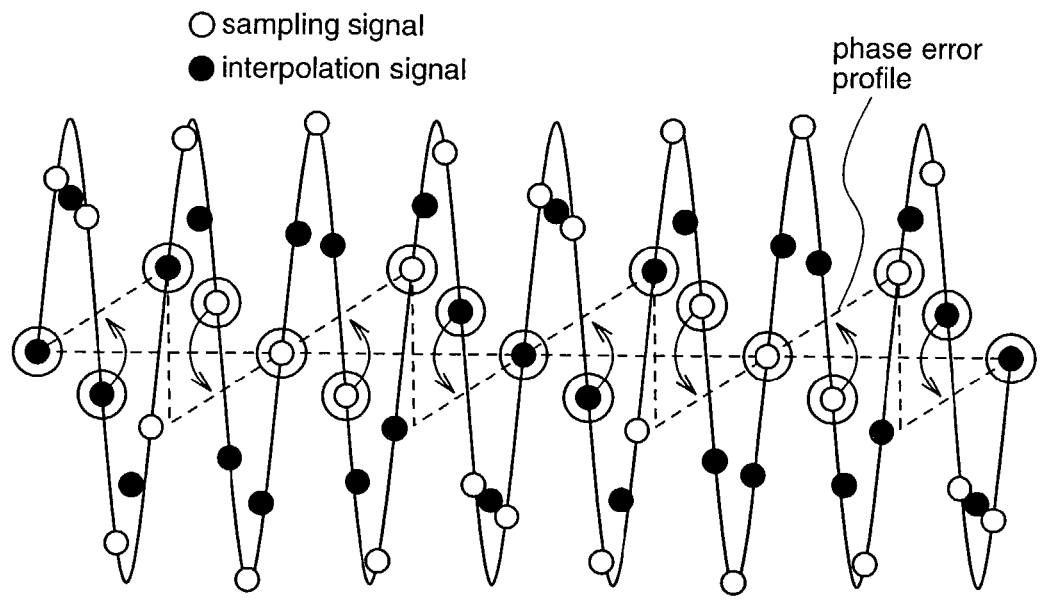
FIGS. 8(a) and 8(b) are diagrams for explaining the operation principle of the half rate processing phase error information detection means 6 using a linear interpolation filter (FIG. 8(a)), or using a Nyquist interpolation filter (FIG. 8(b)).
Figure 8B:
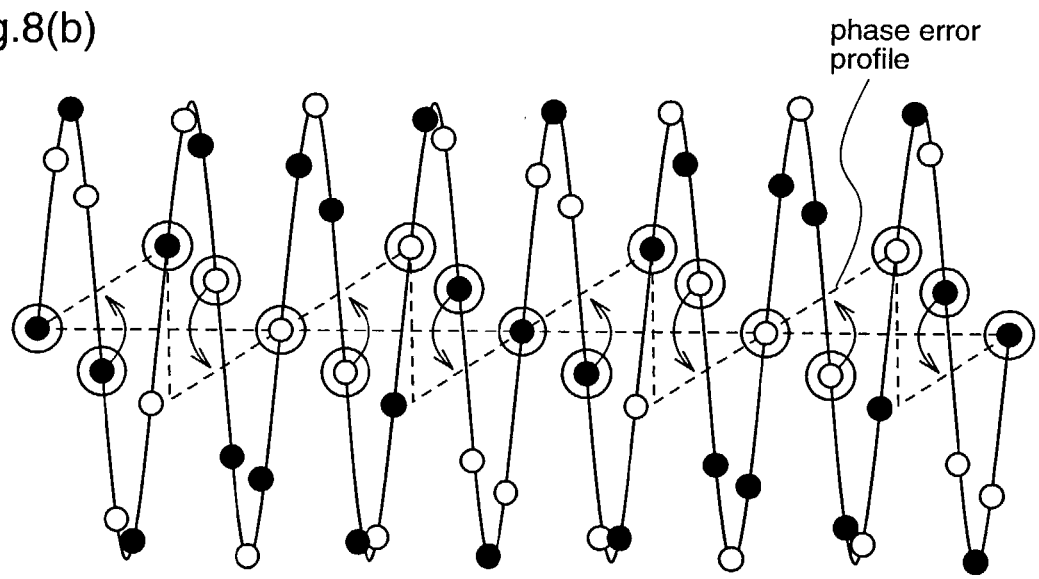

The half rate processing phase error information detection means 6 may use either the linear interpolation filter 11 shown in FIG. 4 or the Nyquist interpolation filter 17 shown in FIG. 5, in the interpolation process for restoring the signals which are missing in the time direction. Further, the phase error information detection means 6 may detect phase error information for synchronizing the phase of the reproduction clock with the phase of one-half frequency of the clock component possessed by the optical disc reproduction data, on the basis of the principle shown in FIGS. 8(a) and 8(b). FIGS. 8(a) and 8(b) show the state where the frequency of the reproduction clock is a little lower than one-half frequency of the clock component possessed by the optical disc reproduction signal. FIG. 8(a) shows the operation principle in the case where interpolation is carried out by the linear interpolation filter 11, and FIG. 8(b) shows the operation principle in the case where interpolation is carried out by the Nyquist interpolation filter 17. Further, FIGS. 8(a) and 8(b) illustrate the signals in the case where the reproduced data are constituted by a single frequency that continues for 4T (T: time corresponding to one channel bit), wherein white circles (○) are sampling signals which are obtained by correcting the offset components of the sampling signals that are sampled by the A/D converter 3, and black circles (●) are interpolation signals which are obtained by restoring the signals that are missing in the time direction, by interpolation.

With respect to each circled signal in the vicinity of the zero cross position, when the sign (plus/minus) of the signal is inverted at the falling edge while maintaining the sign at the rising edge, a phase error profile shown by a dotted line in FIG. 8 is observed according to the amount of phase shift. The amplitude component of the circled signal can be replaced with a deviation of the phase component in the time direction, by utilizing the linearity of the reproduction waveform in the vicinity of the zero cross position. So, considering the rising edge and the falling edge, the amplitude components of the sampling signal and the interpolation signal in the vicinity of the zero cross position are regarded as phase error information. In this case, when the phase error information is observed in the positive direction, the phase is delayed. On the other hand, when it is observed in the negative direction, the phase is advanced. Therefore, when the phase error information is observed in the positive direction, the frequency of the reproduction clock is increased for feedback in the phase advancing direction. Conversely, when it is observed in the negative direction, the frequency of the reproduction clock is reduced for feedback in the phase delaying direction. Under this control, the phase error signal approaches zero, and the phase of the reproduction clock can be synchronized with the phase of one-half frequency of the clock component possessed by the reproduction data. In FIG. 8(a), although some of the interpolation signals restored by the linear interpolation filter 11 are undesirably positioned outside the actual waveform, since these signals are treated as signals having no bearing on the phase error information included in the phase error profile, these signals hardly affect the accuracy of phase sync control. On the other hand, in FIG. 8(b), since interpolation is carried out by the Nyquist interpolation filter 17, the interpolation signals are restored in positions similar to the actual waveform, the accuracy of the phase error information is improved as compared with the case of using the linear interpolation filter 11.

The Nyquist interpolation filter in the half rate processing phase error information detection means 6 may have the same construction as the Nyquist interpolation filter 17 used in the half rate processing offset control means 4. For example, it may be constituted by a FIR filter which employs filter coefficients indicated by white circles (○) 19A~19F having an interval equal to double of the channel bit cycle, on the basis of the Nyquist characteristics shown in FIG. 6.

Next, the output signal from the half rate processing offset control means 4 is inputted to the half rate processing adaptive equalization means 9 to perform partial response equalization. FIGS. 9(a)–9(c) are diagrams for explaining a difference between a PR(a,b,b,a) equalization method (FIG. 9(c)) which is realized by the half rate processing adaptive equalization means 9, and a general binary discrimination method (FIGS. 9(a) and 9(b)). The partial response equalization employs, for a DVD, a PR(a,b,b,a) method in which the waveform amplitude after equalization is separated into five levels as shown in FIG. 9(c). In FIGS. 9(a)–9(c), white circles (○) indicate signals which are obtained by performing partial response equalization on the sampling signals that are synchronized with the phase of one-half frequency of the clock component possessed by the reproduction signal, and black circles (●) indicate interpolation signals which are obtained by restoring the signals that are missing in the time direction, by the Nyquist interpolation filter 17a possessed by the half rate processing adaptive equalization means 9.

In the read channel employed in the conventional digital data reproduction apparatus, demodulation of digital data is carried out by binary discrimination using a slice level, from a waveform-equalized output signal as shown in FIG. 9(a). Further, sampling is carried out as shown in FIG. 9(b), and a multi-bit digital signal obtained by the sampling is also subjected to binary discrimination using the slice level. On the other hand, the PR(a,b,b,a) method has a feature of $(a+b*D+b*D^2+a*D^3)$ that is obtained by adding sampling signals which are sampled at four different times in a ratio of a:b:b:a, thereby adding the low-pass filter characteristics as shown in FIG. 3 to the reproduction signal. In FIG. 3, a PR(1,2,2,1) method and a PR(3,4,4,3) method correspond to the PR(a,b,b,a) method. A PR(a,b,b,a) method having the frequency characteristics closer to the MTF characteristics shown in FIG. 3 is considered as a more effective partial response method. There are various kinds of partial response methods besides the PR(a,b,b,a) method shown in FIG. 3, and the present invention is not restricted to a specific method, that is, any method may be employed as long as it is consistent with the performance. Thereby, PRML signal processing which is advantageous to high-density recording/reproduction in the track recording direction is realized by combining the above-mentioned partial response method in which correlation is added in the time direction of the reproduction data, with a Viterbi decoder which estimates a sequence of the maximum likelihood by utilizing the added correlation, the Viterbi decoder performing a kind of a maximum likelihood method to be described later.

As described above, in the PRML signal processing method, various combinations are possible according to the reproduced waveform characteristics and modulation codes, an appropriate method must be selected for each recording/reproduction system.

The half rate processing adaptive equalization means 9 which performs the above-mentioned partial response equalization, may be provided with a FIR filter constituted by finite taps for performing partial response equalization; a filter coefficient learning means for performing adaptive control so that an equalization error existing in the partial-response-equalized signal (equalized output signal) outputted from the FIR filter is minimized, by using the LMS algorithm; and a Nyquist interpolation filter 17a for restoring interpolation signals which are missing in the time direction, according to the output signal from the FIR filter.

Figure 10:
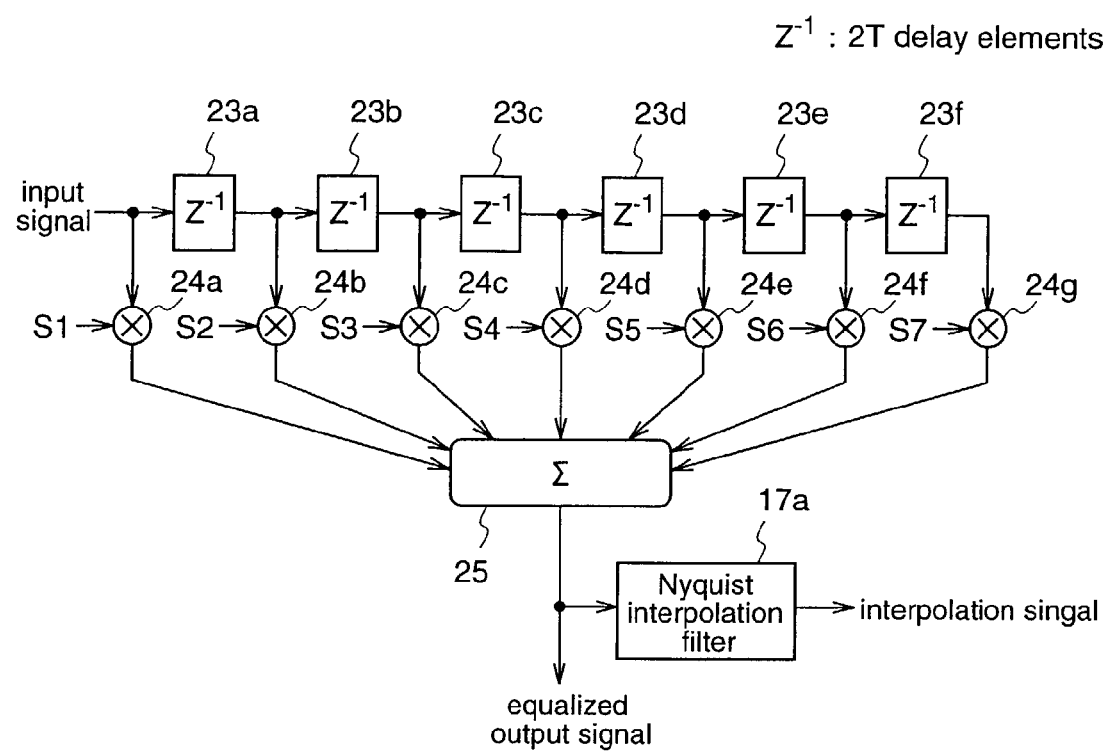
FIG. 10 is a block diagram illustrating the construction of an FIR filter that is a component of the half rate processing adaptive equalization means included in the digital data reproduction apparatus according to the first or second embodiment.

The equalization characteristics of the FIR filter are realized by the filter coefficients being variable. As shown in FIG. 10, the FIR filter may be provided with delay elements 23a~23f each for delaying an input signal by one cycle of the reproduction clock (a cycle of 2T in the present invention); multiplication elements 24a~24g, and an addition means 25. In this FIR filter, the output signal from the addition means 25 is inputted to the Nyquist interpolation filter 17a, and the Nyquist interpolation filter 17a generates interpolation signals.

Further, filter coefficients S1~S7 of the FIR filter are set by the filter coefficient learning means utilizing the LMS algorithm, which performs adaptive control to minimize an equalization error existing in the partial response equalized signal outputted from the addition means 25. The filter coefficient learning means as a component of the half rate processing adaptive equalization means 9 may be constituted as shown in FIG. 11. The filter coefficient learning means shown in FIG. 11 is provided with a provisional judgement circuit 26 for detecting an equalization target value corresponding to the employed partial response method, on the basis of the equalized output signal from the addition means 25; an equalization error detector 27 for detecting an equalization error by subtracting the output signal of the addition means 25 from the equalization target value; a correlation unit 28 for arithmetically operating the correlation between the output signal (equalization error) from the equalization error detector 27 and the input signal (equalized output signal) to the FIR filter; a feedback gain adjustment unit 29 for adjusting the feedback gain by multiplying the output from the correlation unit 28 by the gain; and filter coefficient updation means 30a~30g for updating the filter coefficients by adding the output from the feedback gain adjustment unit 29 to the filter coefficients of the respective taps. At the start of adaptive control, the filter coefficient learning means loads the initial values of the filter coefficients which are stored in the initial value storage means 31a~31g to perform adaptive automatic equalization control for the filter coefficients. In FIG. 9(c), the equalized output signals outputted from the addition means 25 are shown by white circles (○), and the interpolation signals interpolated by the Nyquist interpolation filter 17 are shown by black circles (●).

Thereafter, using the partial response equalized signal obtained through the above-mentioned series of operations, data demodulation is carried out by the half rate processing maximum likelihood decoder 10 which performs decoding adaptive to the type of the partial response.

Figure 12A:
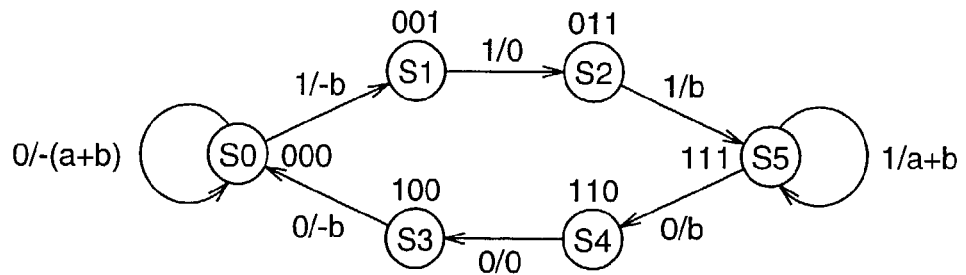
FIG. 12(a) shows a state transition diagram.
Figure 12B:
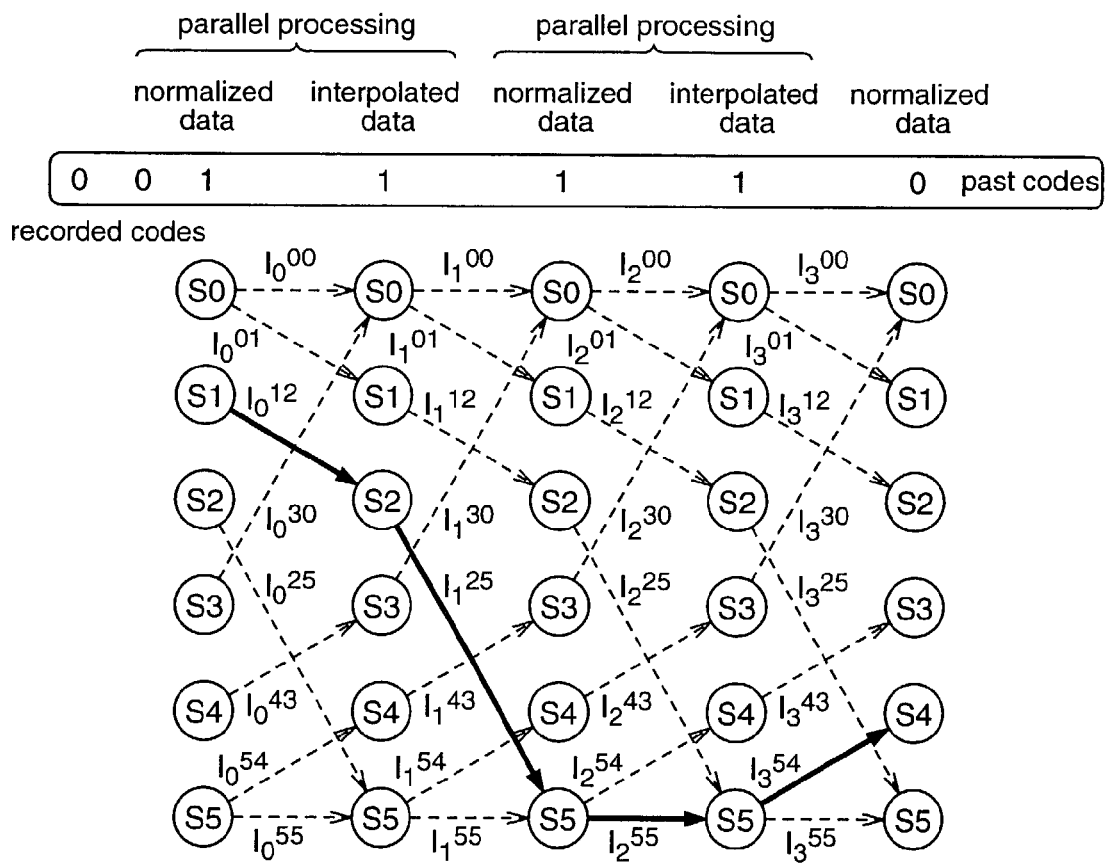
FIG. 12(b) shows a trellis line diagram and a survival path, for explaining the operation principle in the case where a half rate processing maximum likelihood decoder is realized by a Viterbi decoder, in the digital data reproduction apparatus according to the first embodiment.

The half rate processing maximum likelihood decoder 10 may be a Viterbi decoder which performs demodulation using half of the channel bit frequency. The Viterbi decoder performs probability calculation according to the correlation rule of the codes that are intentionally added adaptively to the type of the partial response, thereby estimating a sequence of the maximum likelihood. FIGS. 12(a) and 12(b) are diagrams for explaining the operation principle of the half rate processing maximum likelihood decoder 10 which is implemented by a Viterbi decoder. FIG. 12(a) shows a state transition diagram, and FIG. 12(b) shows a trellis line diagram and a survival path. For example, when the type of the employed partial response is the PR(a,b,b,a) method, the state transits on the basis of the state transition diagram shown in FIG. 12(a). In this case, particularly, 8–16 modulated codes used for a DVD are considered, and the minimum run length is restricted to 2, so that it can be expressed by state transitions of six states from S0 to S5. Further, as for X/Y, X indicates the transition of recorded codes, and Y indicates the signal amplitude at that time. Furthermore, one state is expressed by three adjacent time codes. For example, in the state transition from S4 "110" to S3 "100", when a code "0" is added to "110", "110" shifts to left, and "1" at the left end disappears, resulting in the state S3 "100". However, when the processing rate is half of the channel bit frequency, in the state transition shown in FIG. 12(a), two adjacent states should be combined as one state. For example, when the half rate processing adaptive equalization means 9 outputs the sampling signal which is sampled at the normal sampling position, and the interpolation signal which is restored by interpolation, in parallel with each other, as shown in FIG. 1, the normal data (sampling signal) at the normal sampling position and the interpolation data (interpolation signal) may be inputted to the adjacent two states, respectively, to perform parallel processing. In the parallel processing, the change with time is expressed by the trellis line diagram shown in FIG. 12(b) which is characterized by that the normal data and the interpolation data are processed in parallel with each other. Then, the stochastic length lkab of each path (hereinafter referred to as branch metric) is calculated, and the branch metric is added when transition to each state takes place. In the lkab, k indicates the transition with time, and ab indicates the branch metric in the transition from the state Sa to the state Sb. The value of the branch metric to be added in each state is called "metric", and a path having the minimum metric is sequentially outputted as a survival path, thereby demodulating the data to binary digital data. That is, when the data are demodulated according to the recording codes shown in FIG. 12(b), the path indicated by a solid line is the survival path.

As described above, in the digital data reproduction apparatus according to the first embodiment, the amplitude of the optical disc reproduction signal which is read from the optical recording medium 33 is amplified by the preamplifier 1, and the amplified signal is corrected so as to emphasize the high frequency band by the waveform equalization means 2. Then, the output signal from the waveform equalization means 2 is sampled to generate a multi-bit sampling signal by the A/D converter 3, using the reproduction clock that is generated according to half of channel bit frequency by the clock generation means 8. Then, the offset component in the amplitude direction, which is included in the sampling signal outputted from the A/D converter 3, is corrected by the half rate processing offset control means 4. Thereafter, the output signal from the offset control means 4 is subjected to partial response equalization by the half rate processing adaptive equalization means 9, and decoded by the half rate processing maximum likelihood decoder 10 using the maximum likelihood decoding method. Therefore, by employing the PRML signal processing, the quality of the demodulated data is improved, and power consumption is significantly reduced.

Furthermore, the signals, which are missing in the time direction because the optical disc reproduction signal is sampled with the reproduction clock that is generated according to the frequency component corresponding to half of the channel bit frequency, are restored by using the linear interpolation filter 11 or the Nyquist interpolation filter 17, and offset correction control and phase sync control are carried out using the restored interpolation signals and the sampling signals, whereby the digital data reproduction performance is prevented from being degraded.

[Embodiment 2]

Hereinafter, a digital data reproduction apparatus defined in claims 12 and 13 will be described as a second embodiment of the present invention, with reference to the drawings.

The digital data reproduction apparatus according to the second embodiment performs PRML signal processing at a frequency that is half the channel bit frequency, and offset correction control and phase sync control which are suited to partial response are carried out by using an adaptive equalization means for a normal sampling signal, and an adaptive equalization means based on the Nyquist characteristics for restoring an interpolation signal that is missing in the time direction, thereby to improve the digital data reproduction performance.

Figure 13:
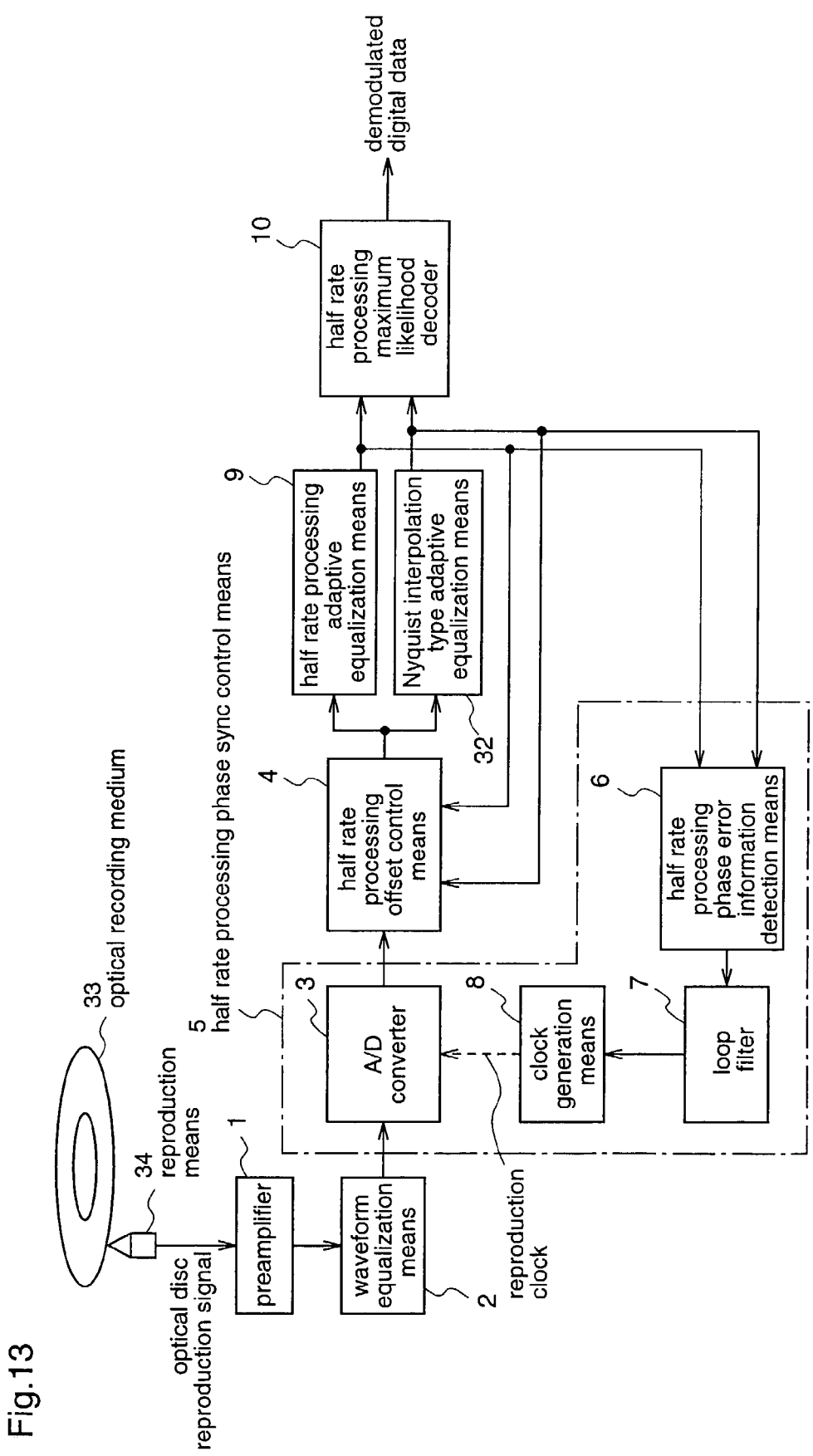
FIG. 13 is a block diagram illustrating the construction of a digital data reproduction apparatus according to the second embodiment of the present invention.
Figure 14:
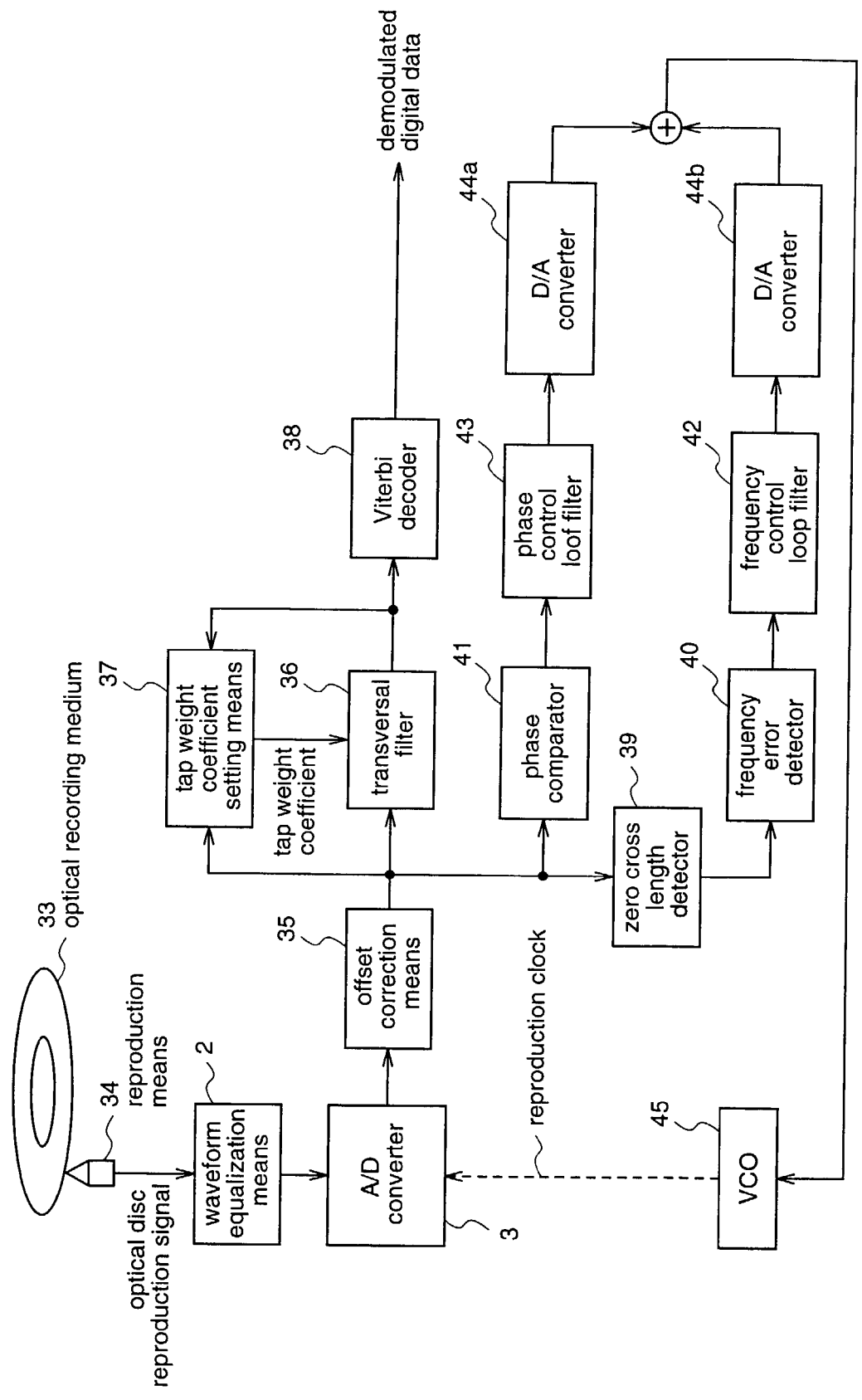
FIG. 14 is a block diagram illustrating the construction of the conventional digital data reproduction apparatus.

FIG. 13 is a block diagram illustrating the construction of the digital data reproduction apparatus according to the second embodiment of the invention.

In FIG. 13, reference numeral 33 denotes an optical recording medium on which digital data, which have been subjected to mark width modulation to make the track recording density constant, are recorded; reference numeral 34 denotes a reproduction means for reproducing the digital data recorded on the optical recording medium 33 to output an optical disk reproduction signal; reference numeral 1 denotes a preamplifier for amplifying the outputted optical disc reproduction signal; reference numeral 2 denotes a waveform equalization means for emphasizing a high frequency component of the optical disc reproduction signal that is amplified by the preamplifier 1; reference numeral 3 denotes an A/D converter for sampling the optical disc reproduction signal in which the high frequency component is emphasized, with a reproduction clock whose frequency is half the channel bit frequency to convert the optical disc reproduction signal into a multi-bit sampling signal; reference numeral 4 denotes an offset control means for half rate processing (hereinafter referred to as a half rate processing offset control means) which corrects an offset component in the amplitude direction, which is included in the sampling signal; reference numeral 9 denotes an adaptive equalization means for half rate processing (hereinafter referred to as a half rate processing adaptive equalization means) which performs equalization on the sampling signal that is corrected by the half rate processing offset control means 4; reference numeral 32 denotes a Nyquist interpolation type adaptive equalization means for restoring an interpolation signal that is missing in the time direction, and performs equalization on the restored interpolation signal; reference numeral 5 denotes a phase sync control means for half rate processing (hereinafter referred to as a half rate processing phase sync control means) which generates a sampling signal synchronized with the phase of one-half frequency of a clock component included in the optical disc reproduction signal; reference numeral 6 denotes a phase error information detection means for half rate processing (hereinafter referred to as a half rate processing phase error information detection means) which detects phase error information for generating a reproduction clock on the basis of the output signal from the half rate processing adaptive equalization means 9 and the output signal from the Nyquist interpolation type adaptive equalization means 32; reference numeral 7 denotes a loop filter for smoothing the phase error information generated by the half rate processing phase error information detection means 6; reference numeral 8 denotes a clock generation means for generating a reproduction clock on the basis of the phase error information that is smoothed by loop filter 7; and reference numeral 10 denotes a maximum likelihood decoder for half rate processing (hereinafter referred to as a half rate processing maximum likelihood decoder) which performs data demodulation on the equalized output signal that is partial-response-equalized by the half rate processing adaptive equalization means 9 and the Nyquist interpolation type adaptive equalization means 32.

Hereinafter, the operation of the digital data reproduction apparatus according to the second embodiment will be described with reference to FIGS. 2, 3, 5, 6, 9~11, and 13.

The reproduction means 34 reproduces the digital data recorded on the optical recording medium 33 to output an optical disc reproduction signal. Then, the preamplifier 1 emphasizes the amplitude of the optical disc reproduction signal, and the waveform equalization means 2 corrects the optical disc reproduction signal so as to emphasize the high-frequency component of the signal.

The waveform equalization means 2 is constituted by a filter that can arbitrarily set an amount of boost and a cut-off frequency. For example, the waveform equalization means 2 may be constituted by a high-order ripple filter having frequency characteristics shown by a solid line in FIG. 2. When no boost is carried out, the high-order ripple filter has characteristics shown by a dotted line in FIG. 2.

Then, the A/D converter 3 samples the optical disc reproduction signal whose high frequency component is emphasized by the waveform equalization means 2, by using the reproduction clock which is generated by the clock generation means 8 and has a frequency that is half the channel bit frequency, thereby generating a multi-bit sampling signal. At this time, according to the sampling theorem, demodulation of the digital data which are sampled by the A/D converter 3 is theoretically possible only when the codes of the digital data to be demodulated are codes whose minimum run length is restricted to 2 like 8–16 modulated codes which are used for a DVD, and the MTF (Mutual Transfer Function) characteristics as the optical reproduction characteristics are as shown in FIG. 3 where signals distributed in a frequency band corresponding to about ¼ or less than the channel bit frequency are sampled by the A/D converter 3 by using the reproduction clock having a frequency component that is half of the channel bit frequency. Utilizing this theorem, the present invention is characterized by that the reproduction clock is generated on the basis of the frequency that is half of the channel bit frequency.

Next, the multi-bit digital signal obtained by the sampling is inputted to the half rate processing offset control means 4, whereby the offset component in the amplitude direction, which is included in the sampling signal, is corrected.

The output signal from the half rate processing offset control means 4 is inputted to the half rate processing adaptive equalization means 9 and to the Nyquist interpolation type adaptive equalization means 32, wherein partial response equalization is carried out. For example, the partial response equalization employs, for a DVD, the PR(a,b,b,a) method in which the waveform amplitude after equalization is separated into five levels as shown in FIG. 9(c). In FIGS. 9(a)–9(c), white circles (○) indicate signals which are obtained by performing partial response equalization on the sampling signals that are synchronized with the phase of one-half frequency of the clock component possessed by the reproduction signal, and black circles (●) indicate interpolation signals which are obtained by restoring signals that are missing in the time direction, by the Nyquist interpolation type adaptive equalization means 32.

The PR(a,b,b,a) method has a feature of $(a+b*D+b*D^2+a*D^3)$ that is obtained by adding sampling signals which are sampled at four different times in a ratio of a:b:b:a, thereby adding the low-pass filter characteristics as shown in FIG. 3 to the reproduction signal. In FIG. 3, a PR(1,2,2,1) method and a PR(3,4,4,3) method correspond to the PR(a,b,b,a) method. A PR(a,b,b,a) method having frequency characteristics closer to the MTF characteristics shown in FIG. 3 is considered as a more effective partial response method. There are various kinds of partial response methods besides the PR(a,b,b,a) methods shown in FIG. 3, and the present invention is not restricted to a specific method, that is, any method may be employed as long as it is consistent with the performance. PRML signal processing which is advantageous to high-density recording/reproduction in the track recording direction is realized by combining the above-mentioned partial response method in which correlation is added in the time direction of the reproduction data, with a Viterbi decoder for estimating a sequence of the maximum likelihood, using the added correlation of data, which Viterbi decoder is a kind of a maximum likelihood method to be described later.

As described above, there are various kinds of PRML signal processing methods depending on the characteristics of reproduced waveforms and the modulated codes, it is necessary to select an appropriate method for each recording/reproduction system.

The half rate processing adaptive equalization means 9 which performs the above-described partial response equalization may have a FIR filter constituted by finite taps for performing the partial response equalization; and a filter coefficient learning means for performing adaptive control so as to minimize an equalization error which exists in the partial response equalized signal (equalized output signal) that is outputted from the FIR filter, by utilizing the LMS algorithm.

Further, the Nyquist interpolation type adaptive equalization means 32 may be provided with an FIR filter having the Nyquist characteristics as shown in FIG. 6; and a filter coefficient learning means for performing adaptive control so as to minimize an equalization error which exists in the interpolated output signal that is outputted from the FIR filter, by utilizing the LMS algorithm.

The equalization characteristics of the FIR filters are realized by making the filter coefficients variable. As shown in FIG. 10, each FIR filter may be provided with delay elements $23a\sim23f$ each for delaying an input signal by one cycle of the reproduction clock (in the present invention, 2T), multiplication elements $24a\sim24g$, and an addition means 25.

Further, filter coefficients S1~S7 of the FIR filter are set by the filter coefficient learning means utilizing the LMS algorithm, which performs adaptive control to minimize an equalization error that exists in the partial response equalized signal outputted from the addition means 25. The filter coefficient learning means may be constituted as shown in FIG. 11. The filter coefficient learning means shown in FIG. 11 is provided with a provisional judgement circuit 26 for detecting an equalization target value corresponding to the partial response method, on the basis of the equalized output signal from the addition means 25; an equalization error detector 27 for detecting an equalization error by subtracting the output signal of the addition means 25 from the equalization target value; a correlation unit 28 for arithmetically operating the correlation between the output signal (equalization error) from the equalization error detector 27 and the input signal (equalized output signal) to the FIR filter; a feedback gain adjustment unit 29 for adjusting the feedback gain by multiplying the output from the correlation unit 28 by the gain; and filter coefficient updation means $30a\sim30g$ for updating the filter coefficients by adding the output from the feedback gain adjustment unit 29 to the filter coefficients of the respective taps. At the start of the adaptive control, the filter coefficient learning means loads the initial values of the filter coefficients which are stored in the initial value storage means $31a\sim31g$ to perform adaptive automatic equalization control for the filter coefficients. The output signal from the half rate processing adaptive equalization means 9 is shown by white circles (○) in FIG. 9(c), and the output signal from the Nyquist interpolation type adaptive equalization means 32 is shown by black circles (●).

Thereafter, the partial-response-equalized signal, which is obtained by the above-mentioned series of operations, is inputted to the half rate processing maximum likelihood decoder 10 that performs decoding adaptive to the type of the partial response, thereby performing data demodulation. The half rate processing maximum likelihood decoder 10 may be a Viterbi decoder as described for the first embodiment, which performs demodulation using a frequency that is half the channel bit frequency.

The half rate processing offset control means 4 according to the second embodiment may be supplied with the equalized output signal from the half rate processing adaptive equalization means 9, instead of the sampling signal from the half rate control means according to the first embodiment, and it may use the output signal from the Nyquist interpolation type adaptive equalization means 32, instead of the output signal from the Nyquist interpolation filter 17. In this case, since the partial-response-equalized signal can be directly used for offset correction control, the accuracy of offset correction control is improved.

In order to realize PRML signal processing, it is necessary to generate, from the optical disk reproduction signal, sampling signals which are synchronized with the phase of one-half frequency of the clock component included in the optical disk reproduction signal. The half rate processing phase sync control means 5 that realizes the PRML signal processing may be constructed as follows.

The half rate processing phase error information detection means 6 is supplied with the equalized output signals which are generated by the half rate processing adaptive equalization means 9 and the Nyquist interpolation type adaptive equalization means 32, on the basis of the output signal which is generated through the A/D converter 3 and the half rate processing offset control means 4. Then, the half rate processing phase error information detection means 6 detects phase error information from the equalized output signals generated by the half rate processing adaptive equalization means 9 and the Nyquist interpolation type adaptive equalization means 32. Then, the loop filter 7 smoothes the phase error information generated by the half rate processing phase error information detection means 6, and the clock generation means 8 performs control so that the phase of the reproduction clock is synchronized with the phase of one-half frequency of the clock component possessed by the optical disk reproduction signal. In this way, a multi-bit sampling signal, which is synchronized with the phase of one-half frequency of the clock component possessed by the optical disk reproduction signal, is generated, thereby realizing the PRML signal processing.

The half rate processing phase error information detection means 6 may detect the phase error information for synchronizing the phase of the reproduction clock with the phase of one-half frequency of the clock component possessed by the optical disc reproduction data, on the basis of the principle as shown in FIG. 8.

As described above, in the digital data reproduction apparatus according to the second embodiment, the amplitude of the optical disc reproduction signal that is read from the optical recording medium 33 is amplified by the preamplifier 1, and the amplified signal is corrected by the waveform equalization means 2 so as to emphasize the high frequency component. Then, the output signal from the waveform equalization means 2 is sampled by the A/D converter 3 to generate multi-bit sampling signals, using the reproduction clock which is generated by the clock generation means 8 with reference to half of the channel bit frequency. Then, the offset components in the amplitude direction, which are included in the sampling signals outputted from the A/D converter 3, are corrected by the half rate processing offset control means 4. Thereafter, the sampling signals, which are synchronized with the phase of one-half frequency of the channel bit frequency included in the reproduction signal, are generated by the half rate processing phase sync control means 5, and partial response equalization is performed on the sampling signals by the half rate processing adaptive equalization means 9 and the Nyquist interpolation adaptive equalization means 32, followed by decoding by the half rate processing maximum likelihood decoder 10 using the maximum likelihood method. Therefore, by employing the PRML signal processing, the quality of the demodulated data is improved, and power consumption is significantly reduced.

Furthermore, the equalized output signal which is obtained by performing equalization on the sampling signals by the half rate processing adaptive equalization means 9, and the equalized output signals which are obtained by performing equalization on the interpolation signals that are restored by the Nyquist interpolation type adaptive equalization means 32, are inputted to the half rate processing offset control means 4 and to the half rate processing phase error information detection means 6. Therefore, the reproduction performance can be further improved by using the partial-response-equalized signals for offset correction control and phase sync control.

What is claimed is:

1. A digital data reproduction apparatus for demodulating digital data from an optical recording medium on which digital data are recorded by recording codes having a constraint that at least three same codes should be continuous, said apparatus comprising:

a half rate processing offset control means for performing offset correction control, while interpolating offset information in an amplitude direction for a missing signal, into a sampling signal which is obtained by sampling a reproduction signal that is obtained by playing the optical recording medium, with a reproduction clock having a frequency equal to half of a channel bit frequency;

a half rate processing phase sync control means for performing phase sync control while interpolating phase error information of the missing signal, into a signal which is obtained by the half rate processing offset control means;

a half rate processing adaptive equalization means for performing partial response adaptive equalization on the signal which has been subjected to the offset correction in the amplitude direction and the phase synchronization by the half rate processing offset control means and the half rate processing phase sync control means, respectively; and a half rate processing maximum likelihood decoding means for performing decoding adaptive to the type of partial response, on the partial-response-adaptive-equalized signal that is outputted from the half rate processing adaptive equalization means.

2. A digital data reproduction apparatus as defined in claim 1, wherein said half rate processing adaptive equalization means comprises:

a first half rate processing adaptive equalization filter for performing partial response adaptive equalization on the sampling signal which is sampled with the reproduction clock; and a second half rate processing adaptive equalization filter for interpolating, by Nyquist interpolation, a signal which is missing at performing sampling to obtain the sampling signal.

3. A digital data reproduction apparatus as defined in claim 1, wherein said half rate processing phase sync control means includes a linear interpolation filter for interpolating a signal which is missing at performing sampling to obtain the sampling signal.

4. A digital data reproduction apparatus as defined in claim 3, wherein said half rate processing phase sync control means determines the phase error information on the basis of the polarity of codes of a sum signal which is obtained by adding the sampling signal, and the signal that is outputted from the Nyquist interpolation filter or the linear interpolation filter.

5. A digital data reproduction apparatus as defined in claim 1, wherein said half rate processing phase sync control means includes a Nyquist interpolation filter for interpolating a signal which is missing at performing sampling to obtain the sampling signal.

6. A digital data reproduction apparatus as defined in claim 5, wherein said half rate processing phase sync control means determines the phase error information on the basis of the polarity of codes of a sum signal which is obtained by adding the sampling signal, and the signal that is outputted from the Nyquist interpolation filter or the linear interpolation filter.

7. A digital data reproduction apparatus as defined in claim 5, wherein said Nyquist interpolation filter is constituted by a finite impulse response filter having a minimum number of taps required for maintaining accuracy.

8. A digital data reproduction apparatus as defined in claim 7, wherein said half rate processing phase sync control means determines the phase error information on the basis of the polarity of codes of a sum signal which is obtained by adding the sampling signal, and the signal that is outputted from the Nyquist interpolation filter or the linear interpolation filter.

9. A digital data reproduction apparatus as defined in claim 1, wherein said half rate processing offset control means includes a linear interpolation filter for interpolating a signal which is missing at performing sampling to obtain the sampling signal.

10. A digital data reproduction apparatus as defined in claim 9, wherein said half rate processing offset control means comprises:
   a zero cross position detection means for detecting a zero cross position where the sampling signal crosses the zero level, and a zero cross position of an interpolation signal which is outputted from the linear interpolation filter or the Nyquist interpolation filter, in parallel with each other; and
   an offset information selection means for determining offset information, on the basis of the polarity of codes of a sum signal which is obtained by adding the zero cross position of the sampling signal and the zero cross position of the interpolation signal.

11. A digital data reproduction apparatus as defined in claim 1, wherein said half rate processing offset control means includes a Nyquist interpolation filter for interpolating a signal which is missing at performing sampling to obtain the sampling signal.

12. A digital data reproduction apparatus as defined in claim 11, wherein said Nyquist interpolation filter is constituted by a finite impulse response filter having a minimum number of taps required for maintaining accuracy.

13. A digital data reproduction apparatus as defined in claim 12, wherein said half rate processing offset control means comprises:
   a zero cross position detection means for detecting a zero cross position where the sampling signal crosses the zero level, and a zero cross position of an interpolation signal which is outputted from the linear interpolation filter or the Nyquist interpolation filter, in parallel with each other; and
   an offset information selection means for determining offset information, on the basis of the polarity of codes of a sum signal which is obtained by adding the zero cross position of the sampling signal and the zero cross position of the interpolation signal.

14. A digital data reproduction apparatus as defined in claim 11, wherein said half rate processing offset control means comprises:
   a zero cross position detection means for detecting a zero cross position where the sampling signal crosses the zero level, and a zero cross position of an interpolation signal which is outputted from the linear interpolation filter or the Nyquist interpolation filter, in parallel with each other; and
   an offset information selection means for determining offset information, on the basis of the polarity of codes of a sum signal which is obtained by adding the zero cross position of the sampling signal and the zero cross position of the interpolation signal.

15. A digital data reproduction apparatus as defined in claim 1, wherein said half rate processing offset control means comprises:
   an interpolation means for interpolating a signal which is missing at performing sampling to obtain the sampling signal;
   a polarity value output means for adding "1" when the polarity of codes of a sum signal, which is obtained by adding the sampling signal and the interpolation signal outputted from the interpolation means for an arbitrary period of time, is positive, and subtracting "1" when the polarity is negative; and
   an accumulation means for accumulating the output result from the polarity value output means for a predetermined period of time that is set by a counter.

16. A digital data reproduction apparatus for demodulating digital data from an optical recording medium on which digital data are recorded by recording codes having a constraint that at least three same codes should be continuous, said apparatus comprising:
   a half rate processing offset control means for performing offset correction control, while interpolating offset information in an amplitude direction for a missing signal, into a sampling signal which is obtained by sampling a reproduction signal that is obtained by playing the optical recording medium, with a reproduction clock having a frequency equal to half of a channel bit frequency;
   a first half rate processing adaptive equalization filter for performing partial response adaptive equalization on the signal which has been subjected to the offset control in the amplitude direction and the phase synchronization by the half rate processing offset control means and a half rate processing phase sync control means, respectively;
   a second half rate processing adaptive equalization filter for interpolating, by Nyquist interpolation, a signal which is missing at performing sampling to obtain the sampling signal;
   a half rate processing phase sync control means for performing phase sync control on the sampling signal, on the basis of the signals obtained by the first and second half rate processing adaptive equalization means; and
   a half rate processing maximum likelihood decoding means for performing decoding adaptive to the type of partial response, on the partial-response-adaptive-equalized signal which is outputted from the half rate processing adaptive equalization means.

17. A digital data reproduction apparatus as defined in claim 16, wherein said half rate processing offset control means performs offset correction in the amplitude direction, on the basis of the signals obtained by the first and second half rate processing adaptive equalization means.

* * * * *